US012022759B2

(12) United States Patent
Shinkai

(10) Patent No.: US 12,022,759 B2
(45) Date of Patent: Jul. 2, 2024

(54) WORKING VEHICLE

(71) Applicant: KUBOTA CORPORATION, Osaka (JP)

(72) Inventor: Atsushi Shinkai, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 438 days.

(21) Appl. No.: 17/351,292

(22) Filed: Jun. 18, 2021

(65) Prior Publication Data

US 2021/0307232 A1  Oct. 7, 2021

Related U.S. Application Data

(63) Continuation of application No. PCT/JP2019/049210, filed on Dec. 16, 2019.

(30) Foreign Application Priority Data

Dec. 26, 2018  (JP) .................................. 2018-243528

(51) Int. Cl.
*A01B 69/04* (2006.01)
*A01B 59/06* (2006.01)
(Continued)

(52) U.S. Cl.
CPC .......... *A01B 69/008* (2013.01); *A01B 59/066* (2013.01); *A01B 76/00* (2013.01);
(Continued)

(58) Field of Classification Search
CPC ..... A01B 69/008; A01B 59/066; A01B 76/00; B60K 35/00; B60K 2370/175; G05D 1/0088
See application file for complete search history.

(56) References Cited

U.S. PATENT DOCUMENTS

2012/0283909 A1* 11/2012 Dix ...................... G05D 1/0225
701/41
2015/0094944 A1  4/2015 Baumann
(Continued)

FOREIGN PATENT DOCUMENTS

EP   3 351 077 A1   7/2018
JP   2003-246275 A  9/2003
(Continued)

OTHER PUBLICATIONS

Official Communication issued in corresponding European Patent Application No. 19903718.5, mailed on Aug. 31, 2022.
(Continued)

*Primary Examiner* — Anne Marie Antonucci
*Assistant Examiner* — Wesam Almadhrhi
(74) *Attorney, Agent, or Firm* — Keating & Bennett, LLP

(57) ABSTRACT

A working vehicle includes a traveling vehicle to autonomously travel on a target traveling route, a working device attached to the traveling vehicle, an offset acquirer to acquire an offset amount and offset direction in a vehicle width direction between a width directional center of the traveling vehicle and a predetermined point in the working device, and a traveling position corrector to correct, based on the offset amount and the offset direction acquired by the offset acquirer, a traveling position of the traveling vehicle so that the predetermined point is located on the target traveling route.

11 Claims, 18 Drawing Sheets

(51) Int. Cl.
    *A01B 76/00*     (2006.01)
    *B60K 35/00*     (2006.01)
    *G05D 1/00*     (2006.01)
    *B60K 35/22*     (2024.01)
    *B60K 35/28*     (2024.01)

(52) U.S. Cl.
    CPC ........... *B60K 35/00* (2013.01); *G05D 1/0088* (2013.01); *B60K 35/22* (2024.01); *B60K 35/28* (2024.01); *B60K 2360/175* (2024.01)

(56) References Cited

U.S. PATENT DOCUMENTS

| | | | |
|---|---|---|---|
| 2017/0177002 A1* | 6/2017 | Ogura | A01B 69/008 |
| 2017/0315005 A1* | 11/2017 | Meid | A01B 63/108 |
| 2017/0354079 A1* | 12/2017 | Foster | G05D 1/0276 |

FOREIGN PATENT DOCUMENTS

| | | |
|---|---|---|
| JP | 2004-008186 A | 1/2004 |
| JP | 2007-191139 A | 8/2007 |
| JP | 2016-093125 A | 5/2016 |
| JP | 2016-093126 A | 5/2016 |
| JP | 2016-095658 A | 5/2016 |
| JP | 2018-116608 A | 7/2018 |
| WO | 2018/202633 A1 | 11/2018 |

OTHER PUBLICATIONS

Official Communication issued in International Patent Application No. PCT/JP2019/049210, mailed on Mar. 10, 2020.

\* cited by examiner

WORKING VEHICLE

CROSS REFERENCE TO RELATED APPLICATIONS

This application is a continuation application of International Application No. PCT/JP2019/049210, filed on Dec. 16, 2019, which claims the benefit of priority to Japanese Patent Application No. 2018-243528, filed on Dec. 26, 2018. The entire contents of each of these applications are hereby incorporated herein by reference.

BACKGROUND OF THE INVENTION

1. Field of the Invention

The present invention relates to a working vehicle including a traveling vehicle and a working device.

2. Description of the Related Art

The working vehicle disclosed in Japanese Unexamined Patent Application Publication No. 2018-116608 is known.

The working vehicle disclosed in Japanese Unexamined Patent Application Publication No. 2018-116608 has a traveling vehicle (a tractor) to autonomously travel along a target traveling route, and a working device to be mounted on the traveling vehicle.

SUMMARY OF THE INVENTION

A working vehicle according to one aspect of a preferred embodiment of the present invention, includes a traveling vehicle to autonomously travel on a target traveling route, a working device attached to the traveling vehicle, an offset acquirer configured or programmed to acquire an offset amount and an offset direction in a vehicle width direction between a width directional center of the traveling vehicle and a predetermined point in the working device, and a traveling position corrector configured or programmed to correct, based on the offset amount and the offset direction acquired by the offset acquirer, a traveling position of the traveling vehicle so that the predetermined point is located on the target traveling route.

In addition, the working device is attached to a rear portion of the traveling vehicle. The offset acquirer is configured or programmed to acquire the offset amount and the offset direction based on a width directional center of the working device defining the predetermined point.

In addition, the working vehicle includes a display device to display an offset amount input portion to which the offset amount is input, and an offset direction input portion to which the offset direction is input. The offset acquirer is configured or programmed to acquire the offset amount input to the offset amount input portion and the offset direction input to the offset direction input portion.

In addition, the working vehicle includes a connector on a rear portion of the traveling vehicle and structured to have the working device attached thereto, and a detector to detect a change in position of the connector in the vehicle width direction relative to a reference position that is a position of the connector at which the width directional center of the traveling vehicle matches the predetermined point in the vehicle width direction. The offset acquirer acquires the offset amount and the offset direction based on the change detected by the detector.

In addition, the connector includes a three-point linkage including a lower linkage, a top linkage, and a lift rod. The working device is connected to at least the lower linkage. The detector includes a sensor to detect the change when a position of the lower linkage changes from the reference position.

In addition, the sensor is an angle sensor or a stroke sensor.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
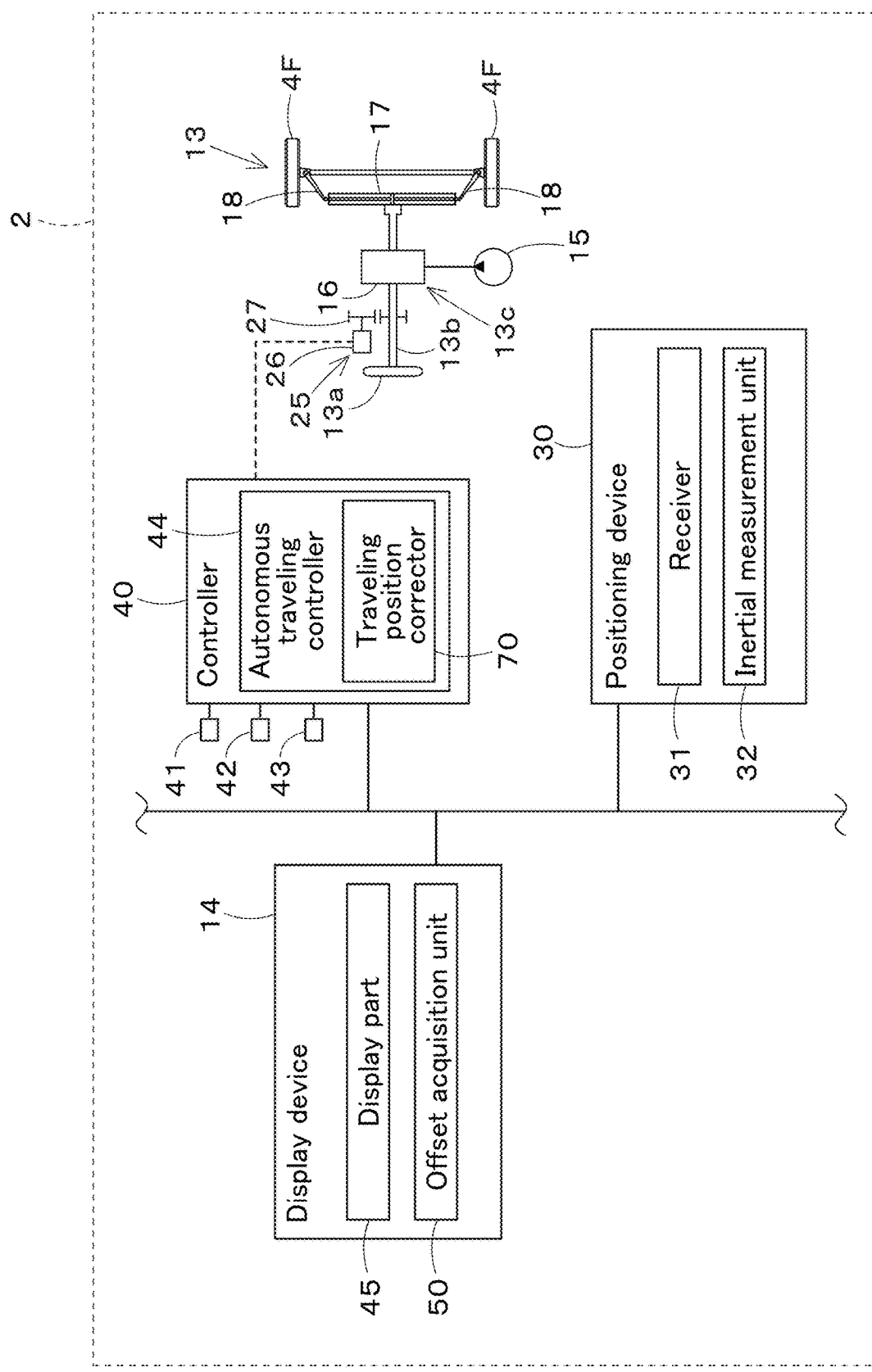
FIG. 1 is a block diagram showing a configuration of a working vehicle according to a preferred embodiment of the present invention.

The preferred embodiments will now be described with reference to the accompanying drawings, wherein like reference numerals designate corresponding or identical elements throughout the various drawings. The drawings are to be viewed in an orientation in which the reference numerals are viewed correctly.

With reference to the drawings, preferred embodiments of the present invention will be described below.

Figure 14:
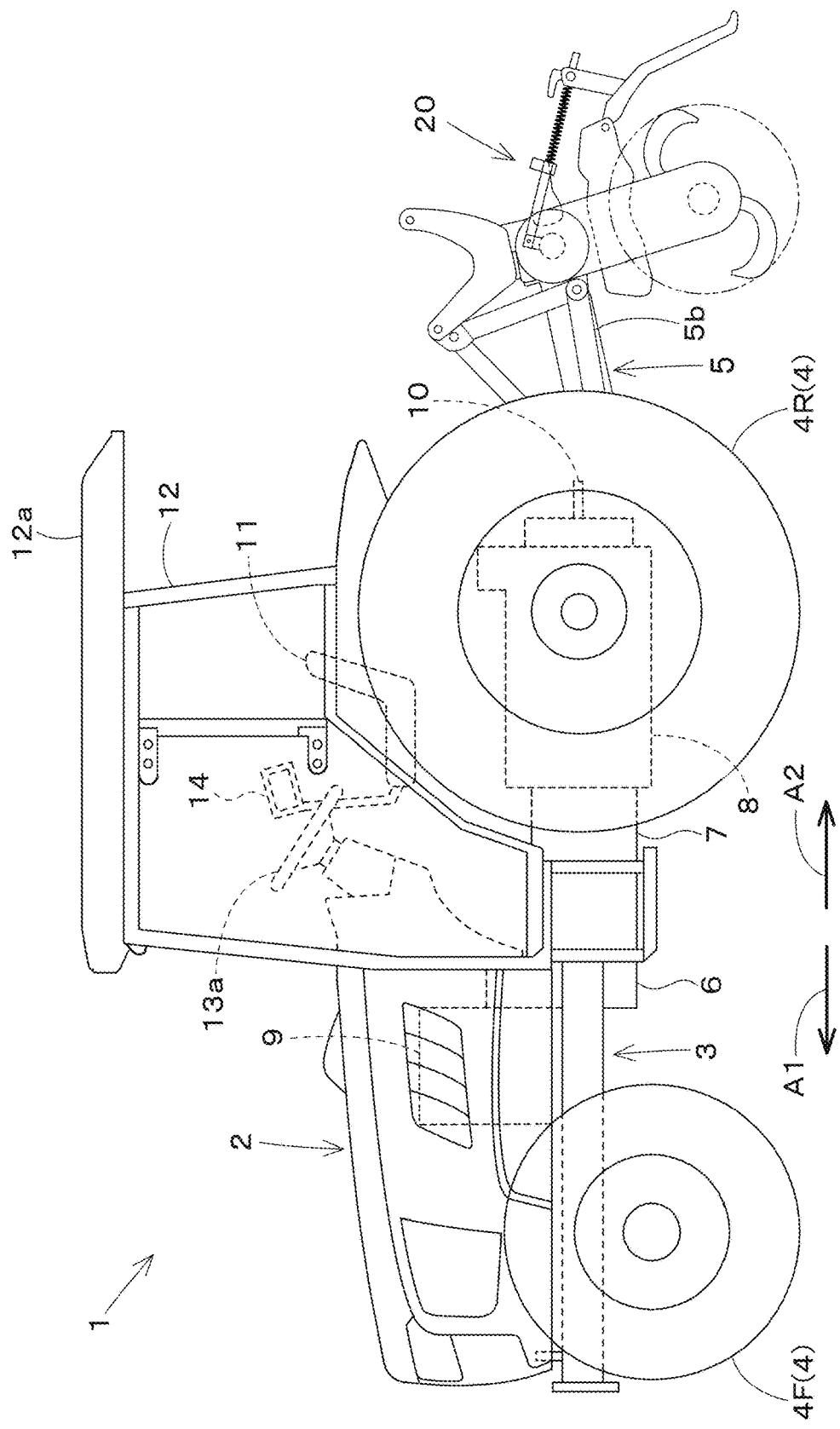
FIG. 14 is a side view of the working vehicle according to a preferred embodiment of the present invention.

FIG. 14 shows a side view of a working vehicle 1 according to a preferred embodiment of the present invention.

The working vehicle 1 includes a traveling vehicle 2 and a working device 20. The traveling vehicle 2 is a tractor in the present preferred embodiment. In the following description, the tractor 2 is explained as the traveling vehicle 2. However, the traveling vehicle 2 is not limited to the tractor.

As shown in FIG. 14, the tractor 2 includes a vehicle body 3, a traveling device 4, and a lifting device 5. In the following description, a forward direction (a direction indicated by an arrowed line A1 in FIG. 14) of a driver sitting on a driver seat 11 of the tractor 2 is referred to as the front, a rearward direction (a direction indicated by an arrowed line A2 in FIG. 14) of the operator is referred to as the rear, a leftward direction of the operator is referred to as the left, and a rightward direction of the operator is referred to as the right. In addition, a horizontal direction perpendicular or substantially perpendicular to a fore-and-aft direction of the tractor 2 is referred to as a vehicle width direction.

A center in the vehicle width direction is also referred to as a "center in width direction".

The vehicle body 3 has a vehicle frame 6, a clutch housing 7, and a transmission case 8. The vehicle frame 6 extends in a fore-and-aft direction of the vehicle body 3.

A prime mover 9 is mounted on the vehicle frame 6. In the present preferred embodiment, the prime mover 9 is an engine 9. The clutch housing 7 is continuously connected to a rear portion of the engine 9 and houses a clutch. The transmission case 8 is connected to a rear portion of the clutch housing 7 and houses a transmission device, a rear wheel differential, and the like. The transmission device includes a main transmission device and a sub transmission device. The transmission device is capable of switching a magnitude of propulsive force of the traveling device 4 through gear shift, and is also capable of switching a traveling direction of the traveling device 4 between forward and backward. A PTO shaft 10 protrudes from a rear portion of the vehicle body 3 (rearward from the transmission case 8).

The traveling device 4 includes front wheels 4F located on a front portion of the vehicle body 3 and rear wheels 4R located on the rear portion of the vehicle body 3. The front wheels 4F are supported by the vehicle frame 6. The rear wheels 4R are supported by respective output shafts of the rear wheel differential.

A driver seat 11 and a cabin 12 surrounding the driver seat 11 are mounted on the vehicle body 3. A display device 14 is located on the periphery of (e.g., right in front of) the driver seat 11.

The display device 14 includes, for example, a touch panel liquid crystal display (a liquid crystal monitor).

The lifting device 5 is provided on the rear portion of the vehicle body 3. The lifting device 5 is an attaching unit or connector to attach the working device 20 to the tractor 2. Hereinafter, the lifting device 5 is also referred to as connector or an attaching unit 5. When the working device 20 is attached to the connector or attaching unit (lifting device) 5, the working device 20 is attached to a rear portion of the tractor 2. This allows the working device 20 to be towed by the tractor 2.

The working device 20 is a device configured to perform work on a ground surface of an agricultural field or the like. For example, the working device 2 is a cultivator for cultivating, a fertilizer sprayer for spraying fertilizer, a pesticide sprayer for spraying pesticides, a harvester for harvesting, a mower for mowing grass and the like, a tedder for diffusing grass and the like, a raking device for collecting grass and the like, or a baler for molding grass and the like. FIG. 14 shows an example in which the cultivator (a rotary cultivator) is attached as the working device 20.

As shown in FIG. 1, the tractor 2 includes a steering device 13. The steering device 13 includes a handling wheel (that is, a steering wheel) 13a, a rotation shaft (that is, a steering shaft) 13b that rotates with the rotating of the steering wheel 13a, and an assist mechanism (that is, a power steering mechanism) 13c that assists the steering of the steering wheel 13a. The auxiliary mechanism 13c includes a hydraulic pump 15, a control valve 16 to which hydraulic fluid output from the hydraulic pump 15 is supplied, and a steering cylinder 17 to be operated by the control valve 16. The control valve 16 is a solenoid valve configured to be operated according to a control signal. For example, the control valve 16 is a three-position switching valve configured to be switched through movement of a spool or the like. The control valve 16 can also be switched through the steering of the steering shaft 13b. The steering cylinder 17 is connected to an arm (that is, a knuckle arm) 18 that changes orientations of the front wheels 4F.

Thus, when the steering wheel 13a is operated, a switching position and an opening aperture of the control valve 16 are switched according to the operation of the steering wheel 13a, and the steering cylinder 17 is extended and contracted rightwardly or leftwardly according to the switching position and the opening aperture of the control valve 16, thus changing the steering directions of the front wheels 4F. The above-mentioned configuration of the steering device 13 is just an example, and a configuration of the steering device 13 is not limited to the above-mentioned configuration.

Figure 2:
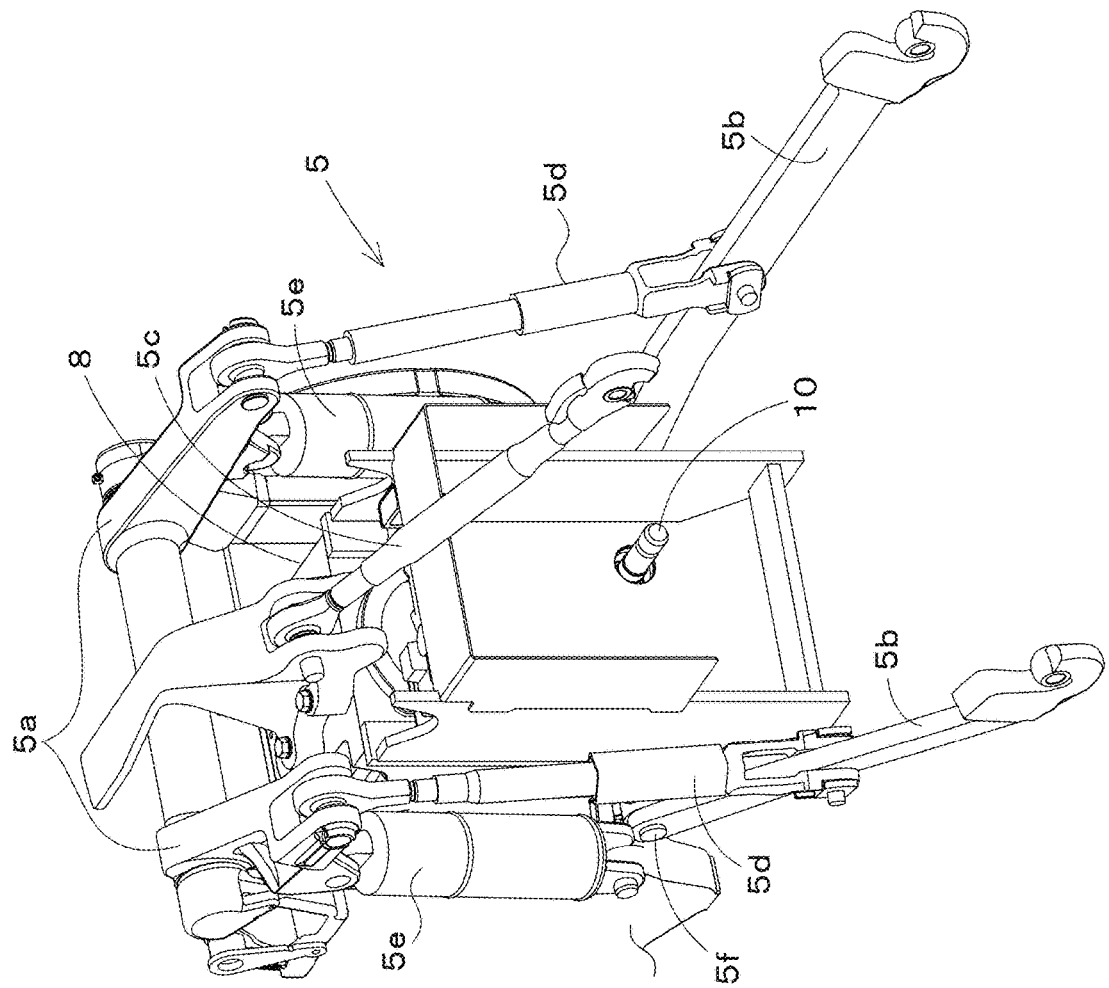
FIG. 2 is a perspective view of an attaching unit (a lifting device) seen from obliquely left rear.

As shown in FIG. 2, the attaching unit (that is, the lifting device or connector) 5 includes lift arms 5a, lower linkages 5b, a top linkage 5c, lift rods 5d, and lift cylinders 5e. Front end portions of the lift arms 5a are supported swingably up and down on a rear portion of the transmission case 8 that houses the transmission device. The lift arms 5a are swung (that is, lifted and lowered) through driving of the lift cylinders 5e. The lift cylinders 5e may be hydraulic cylinders. The lift cylinders 5e are connected to a hydraulic pump with a control valve (not shown in the drawings). The control valve (that is, a control valve for the lift cylinders) is a solenoid valve or the like, and extends and contracts the lift cylinders 5e.

Front end portions 5f of the lower linkages 5b are supported swingably up and down on the rear portion of the tractor 2. The front end portion of the top linkage 5c is supported swingably up and down on a rear portion of the transmission case 8 above the lower linkages 5b. The lift rods 5d connect the lift arms 5a to the lower linkages 5b. The working device 20 is connected to at least the lower linkages 5b. Specifically, the working device 20 is connected to rear portions of the lower linkages 5b and a rear portion of the top linkage 5c. When the lift cylinders 5e are driven (extended and contracted), the lift arms 5a are lifted and lowered, and the lower linkages 5b connected to the lift arms 5a with the lift rods 5d are lifted and lowered. This causes the working device 2 to be swung up and down (that is, lifted and lowered) with the front end portions 5f of the lower linkages 5b as fulcrums.

The lower linkages 5b are attached to the rear portion of the tractor 2, however some mechanical plays (that is, clearances) are provided in their portions attached to the tractor 2. Thus, the lower linkages 5b are allowed to be swung slightly in the vehicle width direction (leftward or rightward) within the mechanical plays, using the front end portions 5f attached to the rear portion of the tractor 2 as fulcrums. The lower linkages 5b are allowed to be swung in this manner, and accordingly the working device 20 is also allowed to be swung slightly in the vehicle width direction (leftward or rightward). This prevents an excessive load from being applied to the working device 20 during the work.

As shown in FIG. 1, the tractor 2 includes a positioning device 30. The positioning device 30 is configured to detect its own position (that is, positioning information including latitude and longitude) with satellite positioning systems (that is, positioning satellites) such as D-GPS, GPS, GLO-NASS, HOKUTO, GALILEO, and MICHIBIKI. That is, the positioning device 30 receives satellite signals (that is, positions of the positioning satellites, transmission times, correction information, and the like) transmitted from the positioning satellite, and detects a position of the tractor 2 (for example, latitude, longitude), that is, detects a vehicle position, based on the satellite signals. The positioning device 30 is located at a center of the tractor 2 in a width direction thereof.

That is, a position of the positioning device 30 in the vehicle width direction matches a center of the tractor 2 in the width direction thereof.

The positioning device 30 includes a receiver 31 and an inertial measurement unit (IMU) 32. The receiver 31 includes an antenna and the like to receive satellite signals transmitted from the positioning satellites, and is attached to the tractor 2 separately from the inertial measurement unit 32. As shown in FIG. 14, in the preferred embodiment, the receiver 31 is mounted on an upper portion of a roof 12a of the cabin 12 of the tractor 2. An attachment location of the receiver 31 is not limited to that of the present preferred embodiment. For example, in the tractor 2 without the cabin 12, the receiver 31 can be attached to an upper portion of the ROPS (Roll-Over Protective Structure) or the like.

The inertial unit 32 includes measurement an acceleration sensor to detect acceleration, a gyro sensor to detect angular velocity, and the like. The inertial measurement unit 32 is located below the tractor 2 (for example, below the driver seat 11). The inertial measurement unit 32 can detect a roll angle, a pitch angle, a yaw angle, and the like of the tractor 2.

As shown in FIG. 1, the steering device 13 includes an autonomous steering mechanism 25. The autonomous steering mechanism 25 is configured to autonomously steer the tractor 2. The autonomous steering mechanism 25 autonomously steers the tractor 2 based on a position of the tractor 2 (referred to as a vehicle position) detected by the positioning device 30. The autonomous steering mechanism 25 includes a steering motor 26 and a gear mechanism 27. The steering motor 26 is a motor to control a rotational direction, a rotational speed, a rotational angle, and the like based on a vehicle position.

The gear mechanism 27 includes a gear located on the rotation shaft (that is, a steering shaft) 13b and configured to rotate with the rotation shaft 13b and another gear located on a rotation shaft of the steering motor 26 and configured to rotate with the rotation shaft 13b. When the rotation shaft of the steering motor 26 rotates, the rotation is transmitted to the rotation shaft 13b through the gear mechanism 27, and then the rotation shaft 13b rotates. This allows steering directions of the front wheels 4F to be changed, and a vehicle position (a center in the vehicle width direction) to match a target traveling route (referred to as a scheduled traveling route) L1 to be described below.

As shown in FIG. 1, the tractor 2 includes a controller 40. The controller 40 is configured or programmed to control a traveling system and a work system of the tractor 2.

The controller 40 is configured or programmed to include an autonomous traveling controller 44 to control autonomous traveling of the tractor 2. The autonomous traveling controller 44 includes electrical and electronic circuits provided in the controller 40, computer programs stored in a CPU, or the like. A control of autonomous traveling of the tractor 2 by the autonomous traveling controller 44 will be described below.

Figure 3:
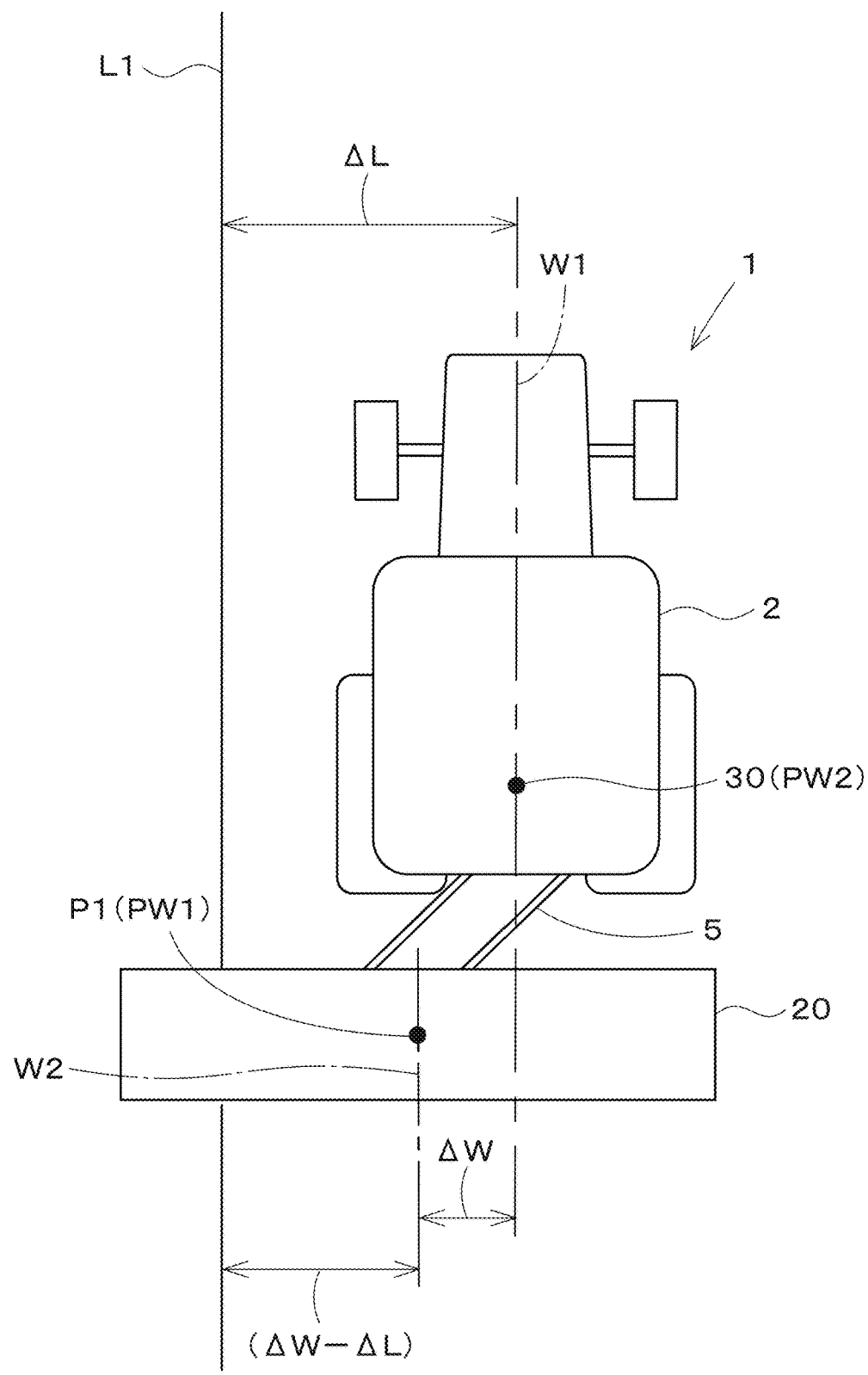
FIG. 3 is an explanation view explaining an operation of an autonomous traveling controller.

FIG. 3 shows an example of a positional relationship between a target traveling route (that is, a scheduled traveling route) L1, the tractor 2, and the working device 20 during autonomous traveling of the tractor 2.

In FIG. 3, a point PW1 shows a position of a control target that is to be positioned on the target traveling route L1 (hereinafter referred to as a "control target position PW1"). A point PW2 shows a vehicle position of the tractor 2 detected by the positioning device 30 (hereinafter referred to as a "detected vehicle position PW2"). Here, the control target position PW1 is positioned at a width directional center W2 of the working device 20, and the detected vehicle position PW2 is positioned at a width directional center W1 of the tractor 2.

A symbol ΔL shows a deviation of the detected vehicle position PW2 from the target traveling route L1 in the vehicle width direction (hereinafter referred to as a "displacement amount"). A symbol ΔW shows a deviation of the control target position PW1 in the vehicle width direction from the detected vehicle position PW2 (hereinafter referred to as an "offset amount"). Hereinafter, the deviation in the left direction may be indicated with a symbol "+" (plus), and the deviation in the right direction may be indicated with a symbol "−" (minus).

The control target position PW1 can be expressed by the following expression: the control target position PW1=the detected vehicle position PW2+ΔW. The detected vehicle position PW2 can be expressed by the following expression: the detected vehicle position PW2=the target traveling route L1−ΔL. Thus, the control target position PW1 can be expressed by the following expression: the control target position PW1=L1+(ΔW−ΔL).

The autonomous traveling controller 44 controls the autonomous traveling of the tractor 2 so that the deviation (ΔW −ΔL) becomes zero. That is, the autonomous traveling controller 44 controls the autonomous traveling of the tractor 2 so that the control target position PW1 matches the target traveling route L1 in the vehicle width direction.

A specific control method by the autonomous traveling controller 44 will be explained below, however the explanation describes a case where ΔW is zero, that is, a case where the control target position PW1 matches the detected vehicle position PW2 in the vehicle width direction. A case where ΔW is not zero will be described later.

When the autonomous traveling controller 44 starts autonomous traveling, the autonomous traveling controller 44 controls the steering motor 26 of the autonomous steering mechanism 25 so that the tractor 2 travels at a position where the deviation (ΔW−ΔL) becomes zero (that is, less than a threshold value). In addition, when the autonomous traveling controller 44 starts the autonomous traveling, the autonomous traveling controller 44 controls a vehicle speed (that is, a velocity) of the tractor 2 by autonomously changing gear shifts of the transmission device, a revolving speed of the prime mover, and the like.

Figure 4A:
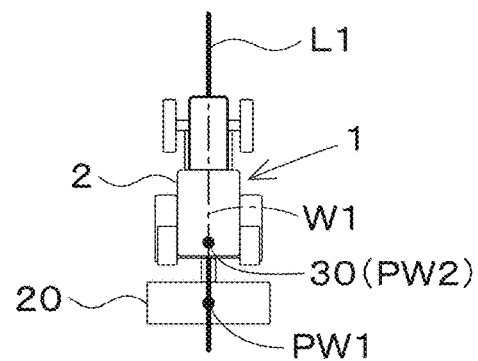
FIGS. 4A to 4D are explanation views explaining the operation of the autonomous traveling controller.

As shown in FIG. 4A, in the autonomous traveling of the tractor 2, when the deviation in the vehicle width direction between the detected vehicle position PW2 from the target traveling route L1 is less than a threshold value (a case where ΔL can be supposed to be zero), the autonomous traveling controller 44 maintains a rotation angle of the rotation axis of the steering motor 26. In this case, since ΔW is zero and ΔL is zero, an expression, (ΔW−ΔL)=0, is satisfied.

Figure 4B:
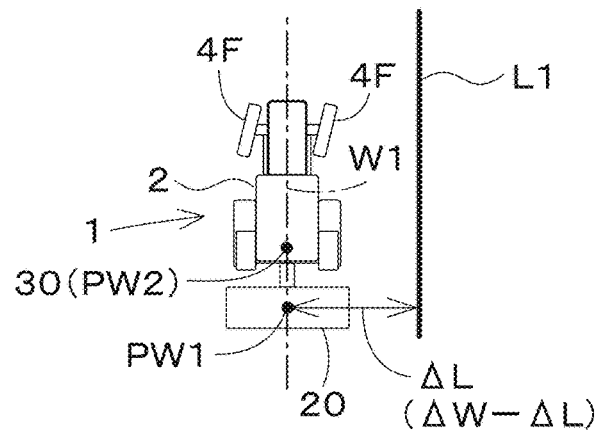

As shown in FIG. 4B, when the deviation ΔL of the detected vehicle position PW2 from the target traveling route L1 is a threshold value or more and the tractor 2 is positioned leftward from the target traveling route L1 (in a case where ΔL>0), the autonomous traveling controller 44 rotates the rotation shaft of the steering motor 26 so that a steering direction of the tractor 2 is orientated to the right. In this case, an expression, (ΔW−ΔL)<0, is satisfied because ΔW is equal to zero and ΔL is greater than zero. The autonomous traveling controller 44 controls autonomous traveling of the tractor 2 so that the expression, (ΔW−ΔL), provides zero through rightward steering of the tractor 2.

Figure 4C:
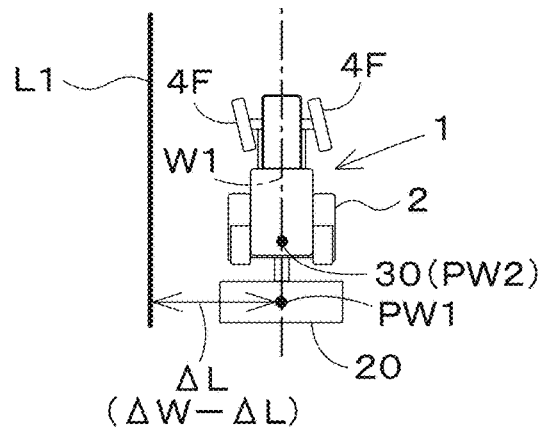

As shown in FIG. 4C, when the deviation ΔL of the detected vehicle position PW2 from the target traveling route L1 is the threshold value or more and the tractor 2 is positioned rightward from the target traveling route L1 (in a case where ΔL<0), the autonomous traveling controller 44 rotates the rotation shaft of the steering motor 26 so that the steering direction of the tractor 2 is orientated to the left. In this case, the expression, (ΔW−ΔL)>0, is satisfied because ΔW is equal to zero and ΔL is smaller than zero. The autonomous traveling controller 44 controls autonomous traveling of the tractor 2 so that the expression, (ΔW−ΔL), provides zero through leftward steering the tractor 2.

The tractor 2 is capable of autonomously traveling on the target traveling route L1 through the above-mentioned control by the autonomous traveling controller 44.

Figure 4D:
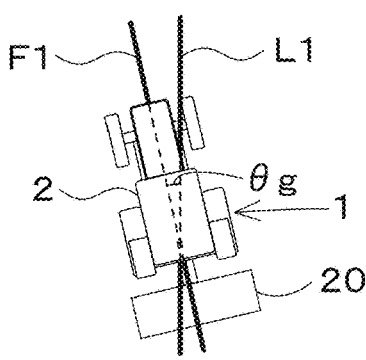

When an azimuth of the target traveling route L1 and an azimuth (that is, a vehicle azimuth) F1 of a traveling direction (that is, the traveling direction) of the tractor (that is, the traveling vehicle) 2 are different, that is, when an angle θg of the vehicle azimuth F1 relative to the target traveling route L1 is a threshold value or more (see FIG. 4D), the autonomous traveling controller 44 may perform a control to set a steering angle so that the angle θg becomes zero (that is, the vehicle azimuth F1 matches an azimuth of the target traveling route L1). The autonomous traveling controller 44 may set a final steering angle in autonomous steering based on a steering angle acquired based on the deviation (that is, a position deviation) and a steering angle acquired based on the azimuth (that is, an azimuth deviation). The setting of a steering angle in autonomous steering according to the above-mentioned preferred embodiment is an example and is not limited thereto.

As shown in FIG. 1, a lifting switch 41, a steering angle detector 42, and a changeover switch 43 are connected to the controller 40. The controller 40 is capable of performing a manual lifting control, an autonomous lifting control, and the like based on operations of the lifting switch 41 and the changeover switch 43 and a steering angle detected by the steering angle detector 42.

The manual lifting control is a control to lift and lower the working device 20 with the attaching unit (that is, the lifting device or connector) 5 based on an operation of the lifting switch 41 operably connected to the controller 40. Specifically, the lifting switch 41 is a three-position changeover switch located in a periphery of the driver seat 11. When the lifting switch 41 is switched from a neutral position to one of the positions, a lifting signal to lift the lifting device 5 (that is, the lift arms 5a) is input to the controller 40. When the lifting switch 41 is switched from the neutral position to the other, a lowering signal to lower the lifting device 5 (that is, the lift arms 5a) is input to the controller 40. When the controller 40 acquires the lifting signal, the controller 40 outputs a control signal to a control valve (that is, a control valve for lift cylinder) to lift the attaching unit (that is, the lifting device or connector) 5, and when the controller 40 acquires the lowering signal, the controller 40 outputs a control signal to the control valve (that is, the control valve for lift cylinder) to lower the attaching unit 5. That is, the controller 40 is capable of performing the manual lifting control for lifting and lowering the attaching unit 5 according to a manual operation of the lifting switch 41.

The autonomous lifting control is a control to autonomously operate the attaching unit (that is, the lifting device or connector) 5 when a steering angle of the steering device 13 is a predetermined angle or more, for example, the steering angle corresponds to a turn, thus lifting the working device 20. The steering angle detector 42 is a device configured to detect a steering angle of the steering device 13. The changeover switch 43 is a switch configured to be switched between on and off to activate or inactivate the autonomous lifting control. When the changeover switch 43 is switched on, the autonomous lifting control is activated, and when the changeover switch 43 is switched off, the autonomous lifting control is inactivated.

When the autonomous lifting control is activated and a steering angle detected by the steering angle detector 42 is greater than or equal to a steering angle corresponding to a turn, the controller 40 performs the autonomous lifting control to autonomously lift the attaching unit 5 by outputting a control signal to a control valve (that is, a control valve for lift cylinder).

As described above, the controller 40 is capable of performing controls relating to the tractor 2, for example, the manual lifting control and the autonomous lifting control.

As shown in FIG. 1, the tractor 2 includes an offset acquisition unit 50.

The offset acquisition unit 50 includes electrical and electronic circuits provided in the display device 14, a computer program stored in an CPU, or the like. The offset acquisition unit 50 may be provided in the controller 40.

The offset acquisition unit 50 is configured or programmed to acquire an offset amount ΔW (see FIGS. 5A and 5B) and an offset direction in the vehicle width direction between the width directional center W1 of the tractor 2 and a predetermined point P1 in the working device 20. The offset direction is a deviation direction (that is, a rightward or leftward direction) of the width directional center W1 of the tractor 2 in the vehicle width direction from the predetermined point P1 in the working device 20. As described above, the width directional center W1 of the tractor 2 matches a position of the positioning device 30 in the vehicle width direction.

Figure 5A:
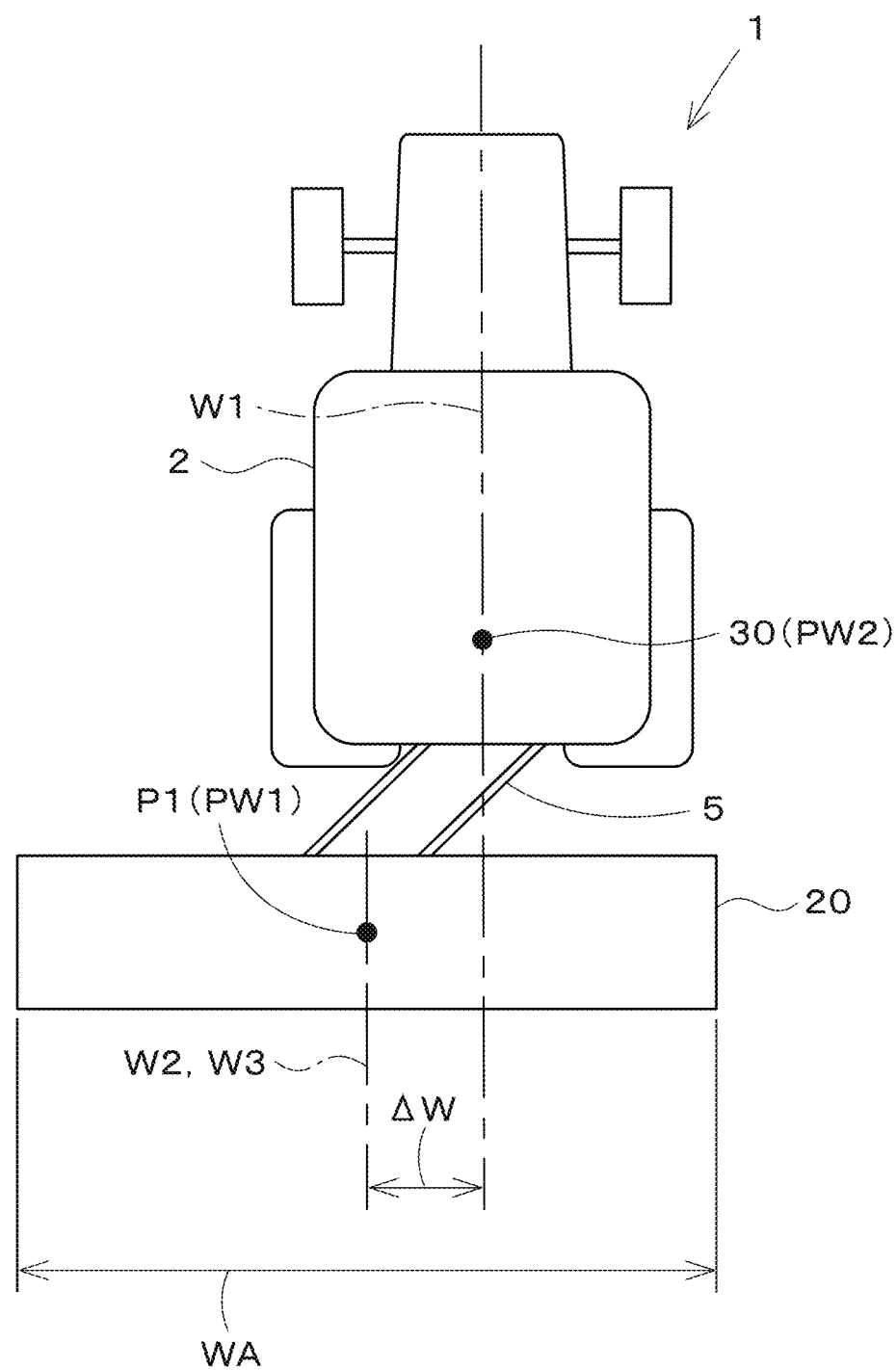
FIG. 5A is a view showing a case where a width directional center of a working device matches a predetermined point in the working device in the vehicle width direction.
Figure 5B:
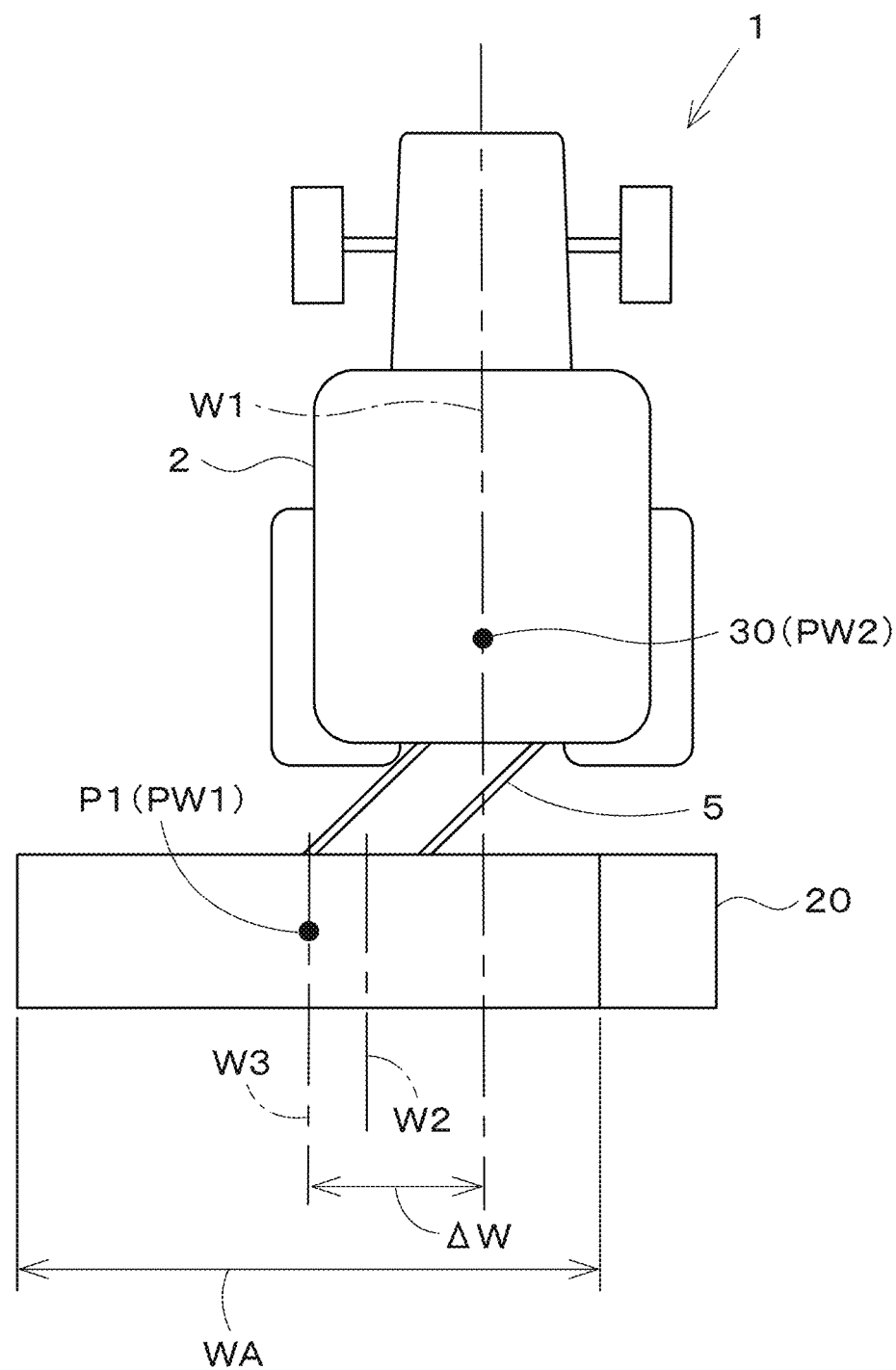
FIG. 5B is a view showing the case where the width directional center of the working device matches the predetermined point in the working device in the vehicle width direction.

The predetermined point P1 in the working device 20 may be set at an appropriate position according to a type, shape, or the like of the working device 20, and may be set so as to match the width directional center W2 of the working device 20 (see FIG. 5A) or may be set at a position that does not match the width directional center W2 of the working device 20 (a position deviating from the width directional center W2) (see FIG. 5B). The predetermined point P1 in the working device 20 matches the control target position PW1 described above.

FIG. 5A shows a case where the predetermined point P1 in the working device 20 matches the width directional center W2 of the working device 20 in the vehicle width direction. For example, as shown in FIG. 5A, when the width directional center W2 of the working device 20 matches a center W3 in a working width (for example, a cultivating width) WA of the working device 20, the width directional center W2 of the working device 20 is set as the predetermined point P1. In this case, the offset acquisition unit 50 acquires the offset amount ΔW and the offset direction based on the width directional center W2 of the working device 20 serving as the predetermined point P1.

FIG. 5B shows a case where the predetermined point P1 in the working device 20 does not match the width directional center W2 of the working device 20 in the vehicle width direction. For example, as shown in FIG. 5B, when the width directional center W2 of the working device 20 does not match the center W3 in the work width WA, the center W3 in the work width WA is set as the predetermined point P1 in the working device 20 instead of the width directional center W2 of the working device 20. In this case, the offset acquisition unit 50 acquires the offset amount ΔW and the offset direction by using a position (the center W3 in the work width WA) displaced from the width directional center W2 of the working device 20 as the predetermined point P1.

For example, when the working device 20 is a cultivator of a center-drive type, the width directional center W2 of the working device 20 is used as the predetermined point P1 because the width directional center W2 of the working device 20 matches the center W3 of the working width (that is, a cultivating width) WA of the working device 20. On the other hand, when the working device 20 is a side-drive cultivator, the center W3 of the working width WA is used as the predetermined point P1 in the working device 20 because the width directional center W2 of the working device 20 does not match the center W3 of the working width (that is, a cultivating width) WA of the working device 20.

A specific configuration of the offset acquisition unit 50 will be described below, taking a case where the width directional center W2 of the working device 20 matches the center W3 of the working width (see FIG. 5A) as an example.

The offset acquisition unit 50 is configured or programmed in a first configuration to acquire an offset amount and an offset direction input by an operator or is configured or programmed in a second configuration to acquire the offset amount and the offset direction based on a detection result detected by the detector 60 to be described below.

First, the first configuration of the offset acquisition unit 50 will be described.

Figure 6:
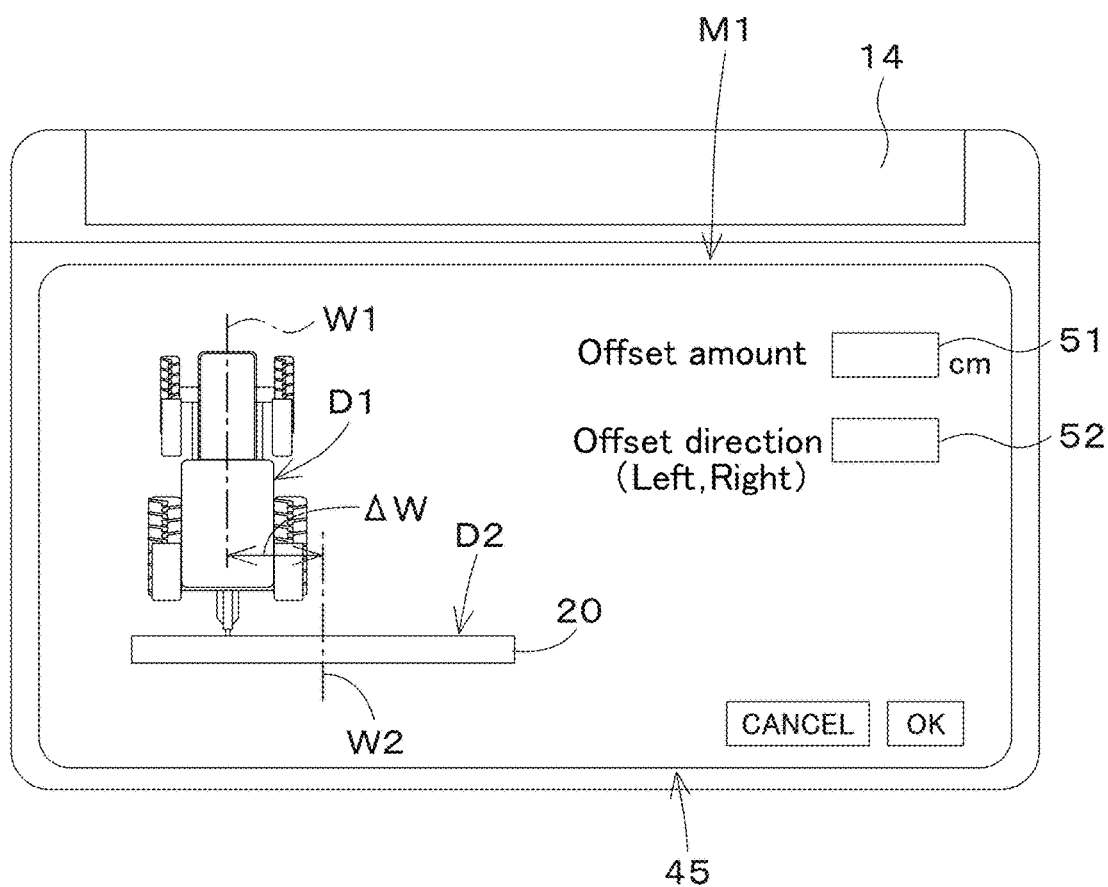
FIG. 6 is a view showing one example of a setting screen displayed on a display part of a display device in a first configuration of an offset acquisition unit.

The first configuration of the offset acquisition unit 50 is used when an offset direction and an offset amount of the width directional center W2 of the working device 20 from the width directional center W1 of the tractor 2 are known before starting of autonomous traveling of the tractor 2. For example, it is used when an operator is aware that the attachment position of the working device 20 is deviated in the vehicle width direction at the time when the operator attaches the working device 20 to the attaching unit (that is, the lifting device or connector) 5. As shown in FIG. 6, the offset acquisition unit 50 displays, in a setting screen M1 of a display part 45 of the display device 14, a figure D1 representing the tractor 2 and a figure D2 representing the working device 20. In addition, the offset acquisition unit 50 displays, in the setting screen M1 displayed on the display part 45 of the display device 14, an offset amount input portion 51 to which the offset amount ΔW is input and an offset direction input portion 52 to which a direction of offset (that is, deviation) is input.

The offset amount input portion 51 is a portion to which a deviation amount (that is, a distance) of the predetermined point in the working device 20 (the width directional center W2 of the working device 20) from the width directional center W1 of the tractor 2 is input as the offset amount ΔW. The offset direction input portion 52 is a portion to which a deviation direction (that is, a rightward or leftward direction) of the width directional center W1 of the tractor 2 from the predetermined point P1 in the working device 20 (that is, the width directional center W2 of the working device 20) is input. In FIG. 6, the offset direction is the "left". It may be configured so that the deviation direction (that is, the right in FIG. 6) of the predetermined point in the working device 20 (that is, the width directional center W2 of the working device 20) from the width directional center W1 of the tractor 2 is input to the offset direction input portion 52, and the offset acquisition unit 50 acquires the offset direction that is a direction (that is, the left in the same illustration) opposite to the inputted deviation direction.

An operator (that is, a driver) inputs the offset amount ΔW to the offset amount input portion 51 displayed on the display device 14, and inputs an offset direction to the offset direction input portion 52. The offset acquisition unit 50 acquires the offset amount ΔW inputted to the offset amount input portion 51 and the offset direction inputted to the offset direction input portion 52.

Next, the second configuration of the offset acquisition unit 50 will be described.

The second configuration of the offset acquisition unit 50 is used, for example, when an offset direction and an offset amount of the width directional center W2 of the working device 20 from the width directional center W1 of the tractor 2 are not known before the starting of autonomous traveling of the tractor 2. For example, it is used when an attachment position of the working device 20 is not deviated in the vehicle width direction at the time when an operator attaches the working device 20 to the attaching unit (that is, the lifting device or connector) 5, but there is a possibility that the deviation may occur during traveling.

Figure 7A:
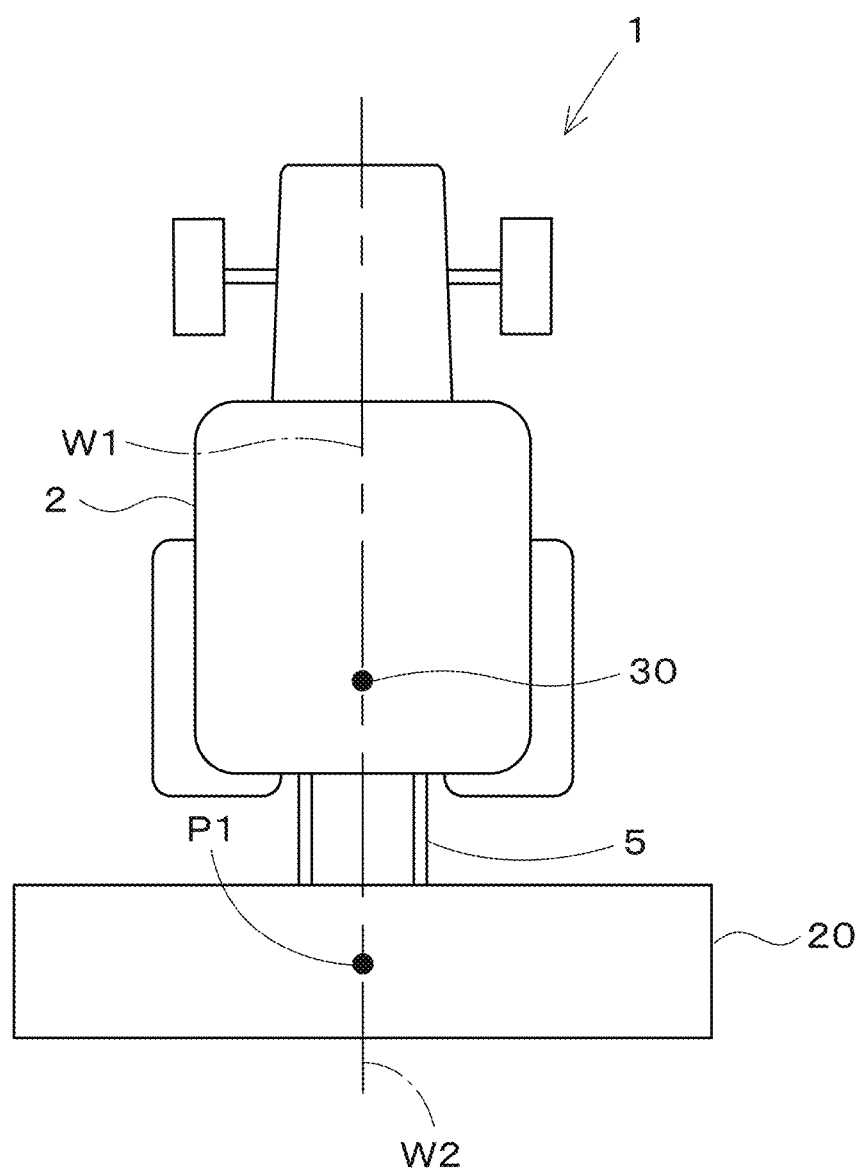
FIG. 7A is an overall view of the working vehicle, which shows a state where the attaching unit is positioned at a reference position.
Figure 7B:
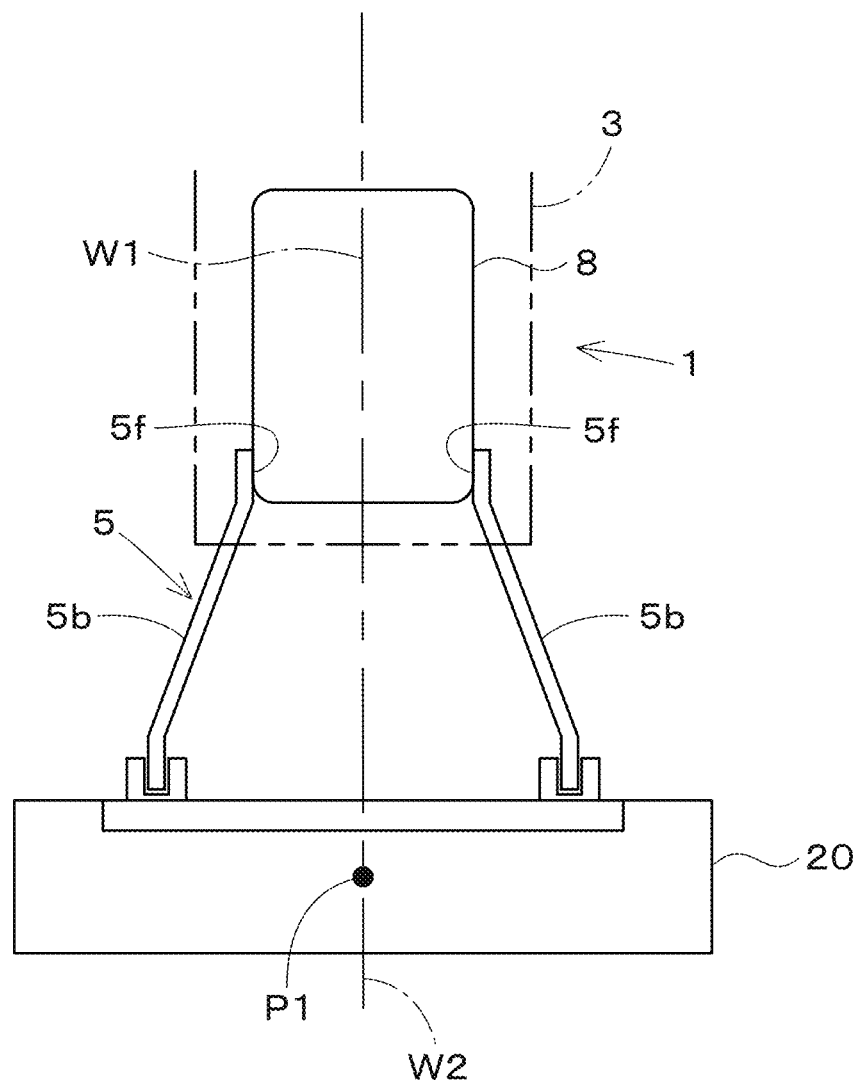
FIG. 7B is a main enlarged view of the working vehicle, which shows the state where the attaching unit is positioned at the reference position.

The offset acquisition unit 50 in the second configuration acquires an offset amount and an offset direction based on a detection result detected by the detector 60. The detector 60 detects a change in a position of the attaching unit (that is, the lifting device or connector) 5 relative to a reference position. The reference position of the attaching unit 5 is a position of the attaching unit 5 where the width directional center W1 of the tractor 2 matches the predetermined point P1 in the working device 20 (the width directional center W2 of the working device 20) in the vehicle width direction. FIGS. 7A and 7B show a state of the attaching unit 5 positioning at the reference position. FIG. 7A is an overall view of the working vehicle 1, and FIG. 7B is a main enlarged view of the working vehicle 1.

The detector 60 is a sensor configured to detect a change when a position of the attaching unit 5 (that is, a position of the lower linkages 5b in the present preferred embodiment) moves from the reference position. For example, an angle sensor or a stroke sensor is used as the above-mentioned sensor.

Figure 8:
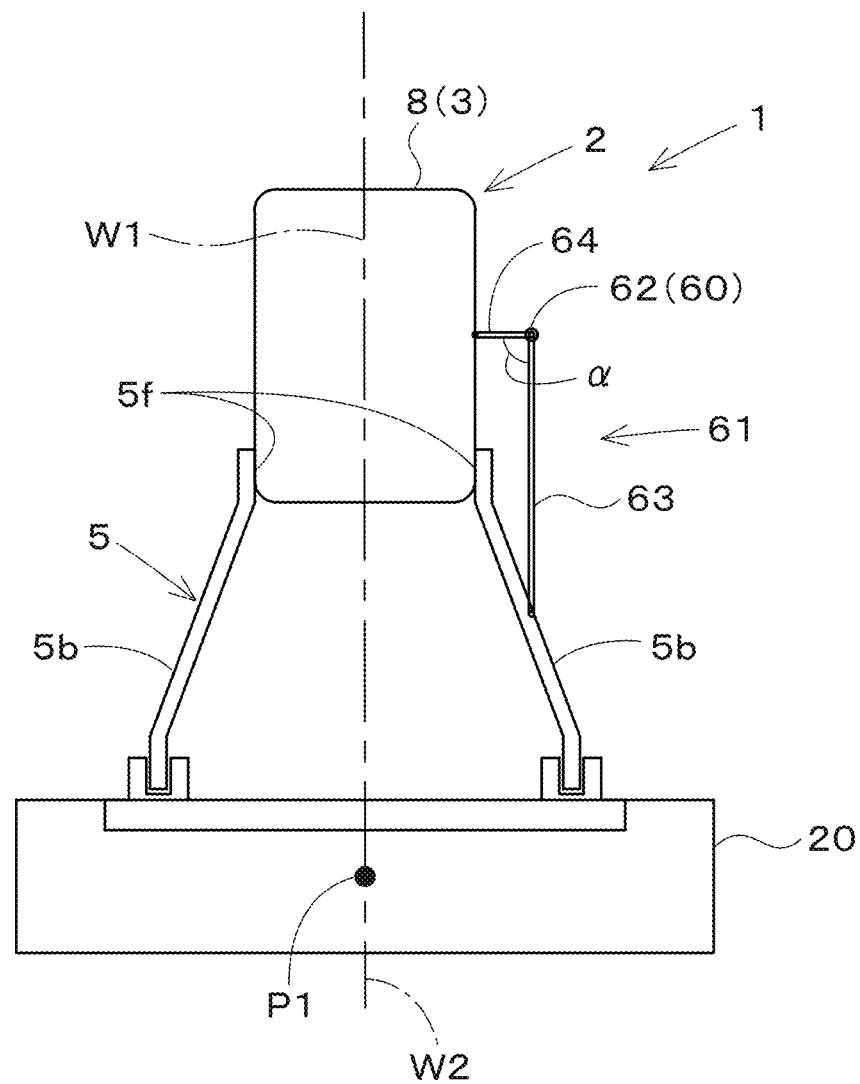
FIG. 8 is a view showing an example of a first detection mechanism having an angle sensor serving as a detector.

FIG. 8 shows an example of a first detection mechanism 61 using an angle sensor 62 as the detector 60.

The first detection mechanism 61 includes a connecting rod 63, an arm 64, and an angle sensor 62. The connecting rod 63 is connected (pivotally supported) at one end thereof to the middle portion of one of the lower linkages 5b and extends forward therefrom. The other end of the connecting rod 63 is connected (pivotally supported) to the arm 64. One end of the arm 64 is connected (pivotally supported) to the other end of the connecting rod 63. The other end of the arm 64 is connected (pivotally supported) to a side surface of the vehicle body 3 (that is, the transmission case 8) of the tractor 2.

When the lower linkages 5b are swung in the vehicle width direction (leftward or rightward) with the front end portions 5f as a fulcrum relative to the tractor 2, the connecting rod 63 moves in the fore-and-aft direction according to the swinging. When the connecting rod 63 moves in the fore-and-aft direction, the arm 64 rotates centered on the second end thereof connected to the tractor 2, and an angle α of the arm 64 from the connecting rod 63 changes.

The angle sensor 62 is attached to a junction between the connecting rod 63 and the arm 64, and detects a change in the angle α between the connecting rod 63 and the arm 64, the change being caused by rotation of the arm 64.

Figure 9:
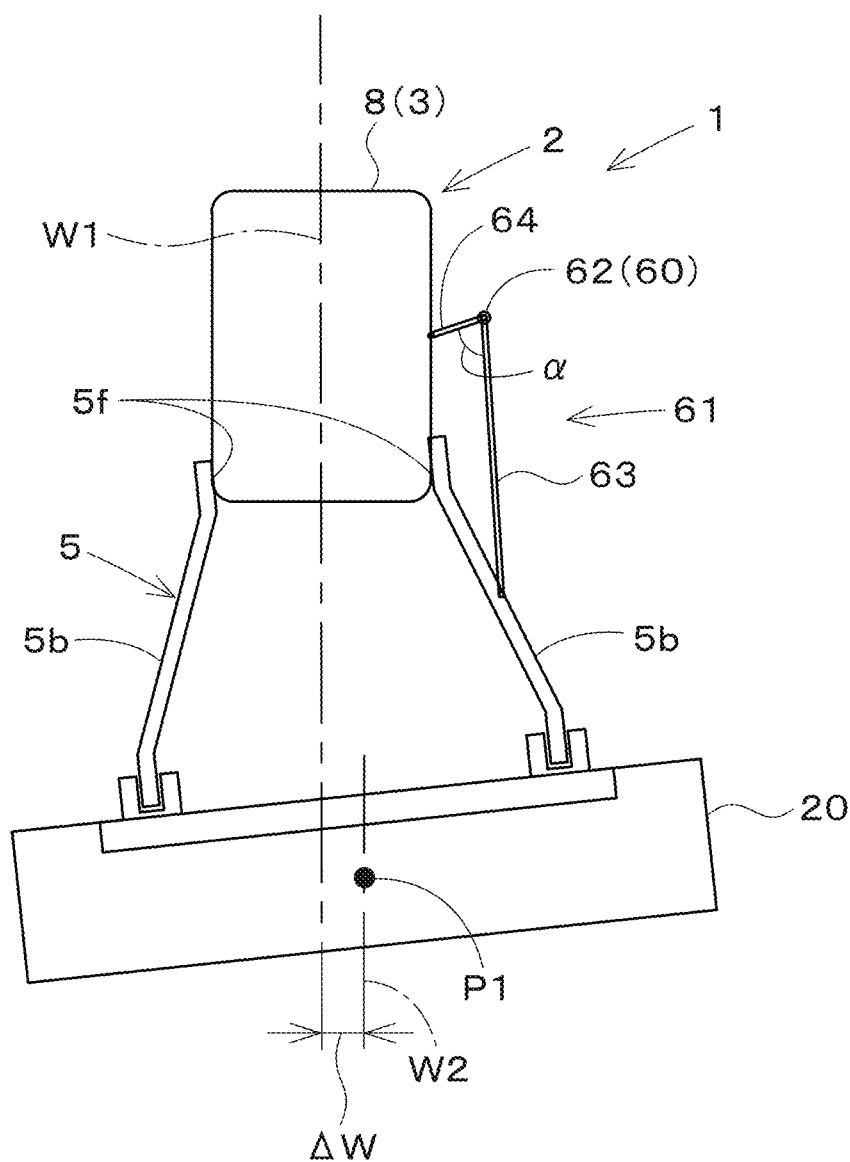
FIG. 9 is a view showing the first detection mechanism of a case where the predetermined point in the working device offsets rightward from the width directional center of the traveling vehicle.

For example, as shown in FIG. 9, consider a case where the working device 20 moves (swings) rightward in the vehicle width direction relative to the tractor 2 during autonomous traveling of the tractor 2, and the predetermined point P1 (that is, the width directional center W2) in the working device 20 is offset rightward from the width directional center W1 of the tractor 2. In this case, the lower linkages 5b to which the working device 20 are connected swing rightward from the tractor 2 using the front end portions 5f as fulcrums, thus causing the connecting rod 63 to move forward. When the connecting rod 63 moves forward, the angle α changes (that is, decreases), and the angle sensor 62 detects this change in angle.

As described above, the angle sensor 62, which is the detector 60 in the first detection mechanism 61, detects a change in angle α relative to the angle α formed when the attaching unit 5 is at the reference position (that is, a difference between the angle α in FIG. 8 and the angle α in FIG. 9), and thus detects a change in position of the attaching unit 5 in the vehicle width direction relative to the reference position (that is, swinging in the vehicle width direction).

Figure 10:
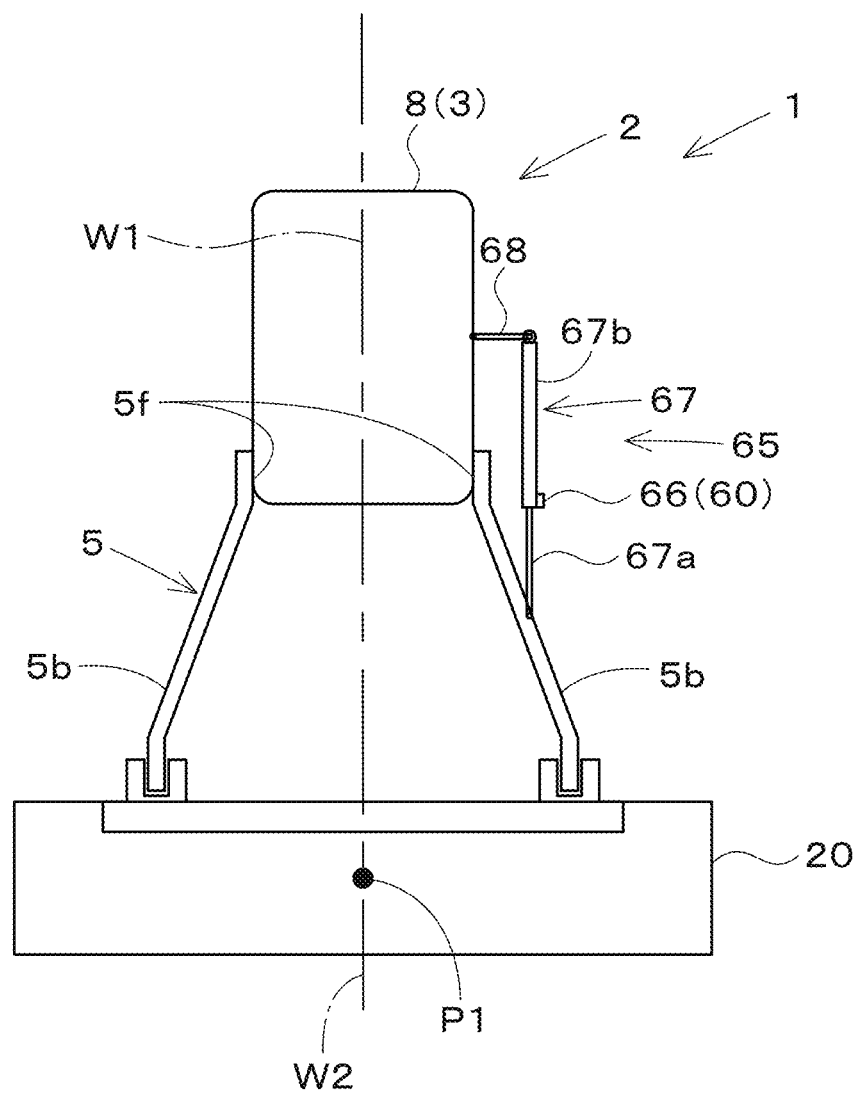
FIG. 10 is a view showing an example of a second detection mechanism having a stroke sensor serving as the detector.

FIG. 10 shows an example of a second detection mechanism 65 using a stroke sensor 66 as the detector 60.

The second detection mechanism 65 includes a cylinder device 67, an arm 68, and a stroke sensor 66. The cylinder device 67 includes a tip end (that is, a tip end of a rod 67a) connected (pivotally supported) to the middle of one of the lower linkages 5b, and a base end (that is, a base end of a tube 67b) connected (pivotally supported) to one end of the arm 68.

The cylinder device 67 extends in the fore-and-aft direction, and the rod 67a can be extended and contracted in the fore-and-aft direction. The other end of the arm 68 is connected to the side surface of the vehicle body 3 (that is, the transmission case 8) of the tractor 2. An angle of the arm 68 relative to the vehicle body 3 is fixed. The stroke sensor 66 is attached to the cylinder device 67 and detects an extending or contracting extent of the rod 67a of the cylinder device 67.

When the lower linkages 5b are swung in the vehicle width direction (leftward or rightward) with the front end portions 5f as the fulcrum relative to the tractor 2, the rod 67a of the cylinder device 67 extends or contracts according to the swinging, and the stroke sensor 66 detects the extending or contracting extent of the rod 67a.

Figure 11:
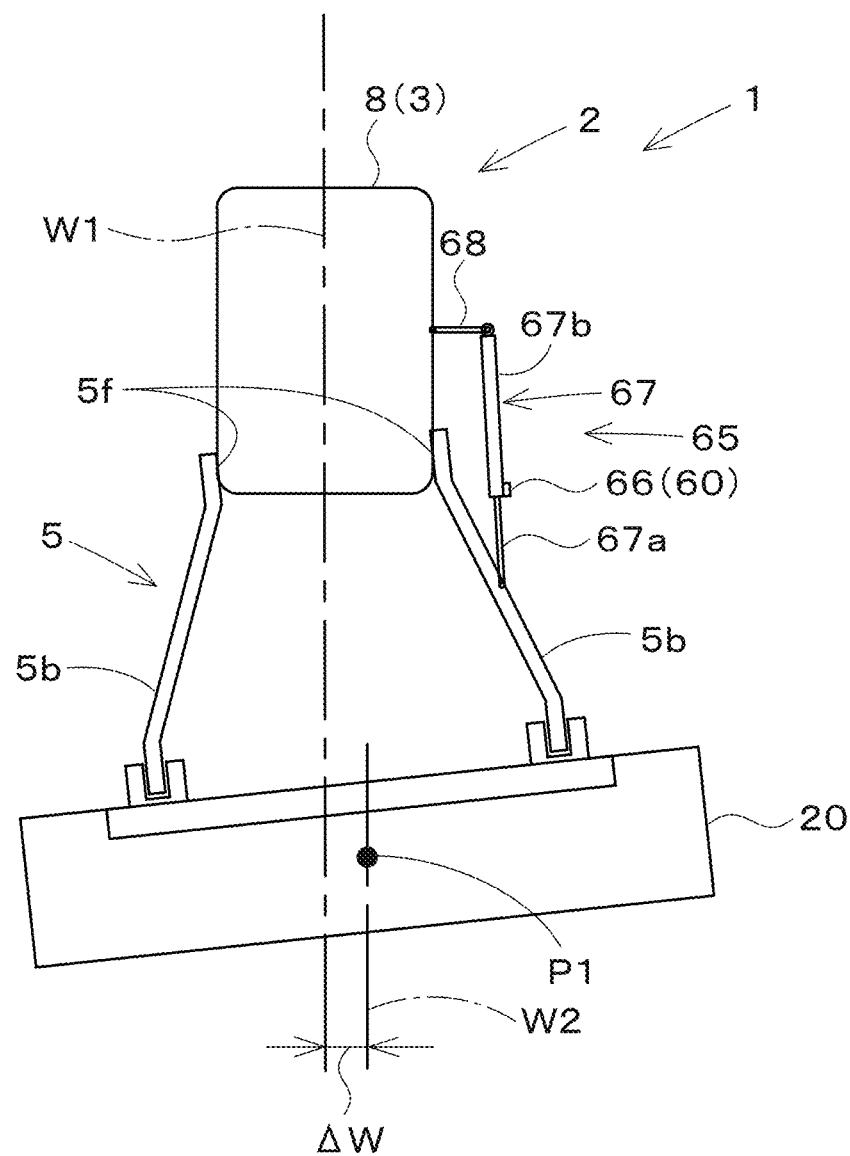
FIG. 11 is a view showing the second detection mechanism of the case where the predetermined point in the working device offsets rightward from the width directional center of the traveling vehicle.

For example, as shown in FIG. 11, consider a case where the working device 20 moves (swings) rightward in the vehicle width direction relative to the tractor 2 during autonomous traveling of the tractor 2, and the predetermined point P1 (that is, the center W2 in width direction) in the working device 20 is offset rightward relative to the width directional center W1 of the tractor 2. In this case, the lower linkages 5b to which the working device 20 is connected swing rightward relative to the tractor 2 with the front end portions 5f as the fulcrums, and a length of the rod 67a of the cylinder device 67 changes (shortens).

The stroke sensor 66 detects this change in length of the rod 67a of the cylinder device 67.

As described above, the stroke sensor 66, which is the detector 60 in the second detection mechanism 65, detects a change in length (that is, a change in stroke) relative to a length of the rod 67a of the cylinder device 67 when the attaching unit 5 is at the reference position, and thus detecting a change in position of the attaching unit 5 in the vehicle width direction relative to the reference position (that is, detecting swinging in the vehicle width direction).

The above description explains the case where the angle sensor 62 or the stroke sensor 66 is used as the detector 60, however the detector 60 is not limited to the angle sensor 62 and the stroke sensor 66. For example, the detector 60 may include a camera attached to the tractor 2 and an image analyzer configured to analyze images captured by the camera. This case can have a configuration where a camera captures the attaching unit 5 or the working device 20, and the image analyzer detects, based on the captured image, a change in position of the attaching unit 5 or the working device 20 in the vehicle width direction.

The offset acquisition unit 50 calculates and acquires the offset amount ΔW and an offset direction based on a changing extent detected by the detector 60. For example, when the detector 60 is an angle sensor 62, the offset acquisition unit 50 calculates and acquires the offset amount ΔW and an offset direction based on a changing extent of the angle α detected by the detector 60 and known information previously input to and stored in the offset acquisition unit 50 (e.g., lengths and attachment angles of the lower linkages 5b, a length of the working device 20 in the vehicle width direction, a length of the arm 64, a length of the connecting rod 63, positions of the front end portions 5f of the lower linkages 5b, a connecting position of the arm 64 relative to the tractor 2, a connecting position of the connecting rod 63 relative to the lower linkages 5b, the angle α defined when the working device 20 is at the reference position).

For example, when the detector 60 is the stroke sensor 66, the offset acquisition unit 50 calculates and acquires the offset amount ΔW and an offset direction based on a changing extent of the rod 67a detected by the detector 60 and known information previously input to and stored in the offset acquisition unit 50 (e.g., lengths and attachment angles of the lower linkages 5b, a length of the working device 20 in the vehicle width direction, a length of the arm 68, a length of the cylinder device 67, positions of the front end portions 5f of the lower linkages 5b, a connecting position of the arm 64 relative to the tractor 2, a connecting position of the rod 67a relative to the lower linkages 5b, a length of the rod 67a at the time when the working device 20 is at the reference position).

As shown in FIG. 1, the autonomous traveling controller 44 of the tractor 2 is configured or programmed to include a traveling position corrector 70 configured to correct a traveling position of the tractor 2. The traveling position corrector 70 includes electrical and electronic circuits provided in the controller 40, a computer program stored in a CPU, or the like. The traveling position corrector 70 may be configured as a part of the autonomous traveling controller 44b, or may be configured separately from the autonomous traveling controller 44 but may be operable in synchronization with the autonomous traveling controller 44. The traveling position corrector 70 may be provided in the display device 14.

Figure 12:
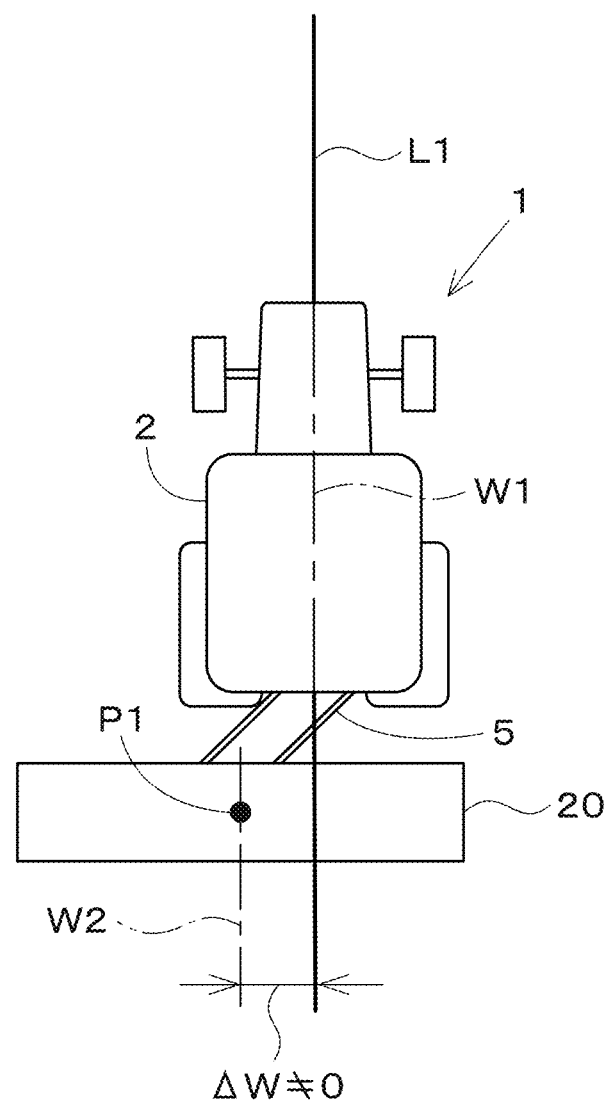
FIG. 12 is a view showing examples of positions of the traveling vehicle and the working device in a case where a traveling position corrector corrects a traveling position of the traveling vehicle.

The traveling position corrector 70 corrects a traveling position of the tractor 2 so that the predetermined point P1 (that is, the control target position PW1) in the working device 20 is located on the target traveling route L1 based on an offset amount and an offset direction acquired by the offset acquisition unit 50. In detail, the traveling position corrector 70 corrects a traveling position of the tractor 2 based on an offset amount and an offset direction when the predetermined point P1 in the working device 20 is not located on the target traveling route L1 and the offset amount ΔW is not equal to zero (for example, in a case shown in FIG. 12). The correction of the traveling position of the tractor 2 by the traveling position corrector 70 is executed in a manner in which the autonomous traveling controller 44 changes steering directions of the front wheels 4F based on a command (that is, a control signal) from the traveling position corrector 70.

The "control based on an offset direction" executed by the traveling position corrector 70 includes two types of control.

A first control is executed when an offset direction of the width directional center W1 of the tractor 2 from the predetermined point P1 in the working device 20 matches a displacement direction of the target traveling route L1 from the predetermined point P1 in the working device 20.

A second control is executed when an offset direction of the width directional center W1 of the tractor 2 from the predetermined point P1 in the working device 20 does not match (that is, in opposite direction to) a displacement direction of the target traveling route L1 from the predetermined point P1 in the working device 20.

Figure 13A:
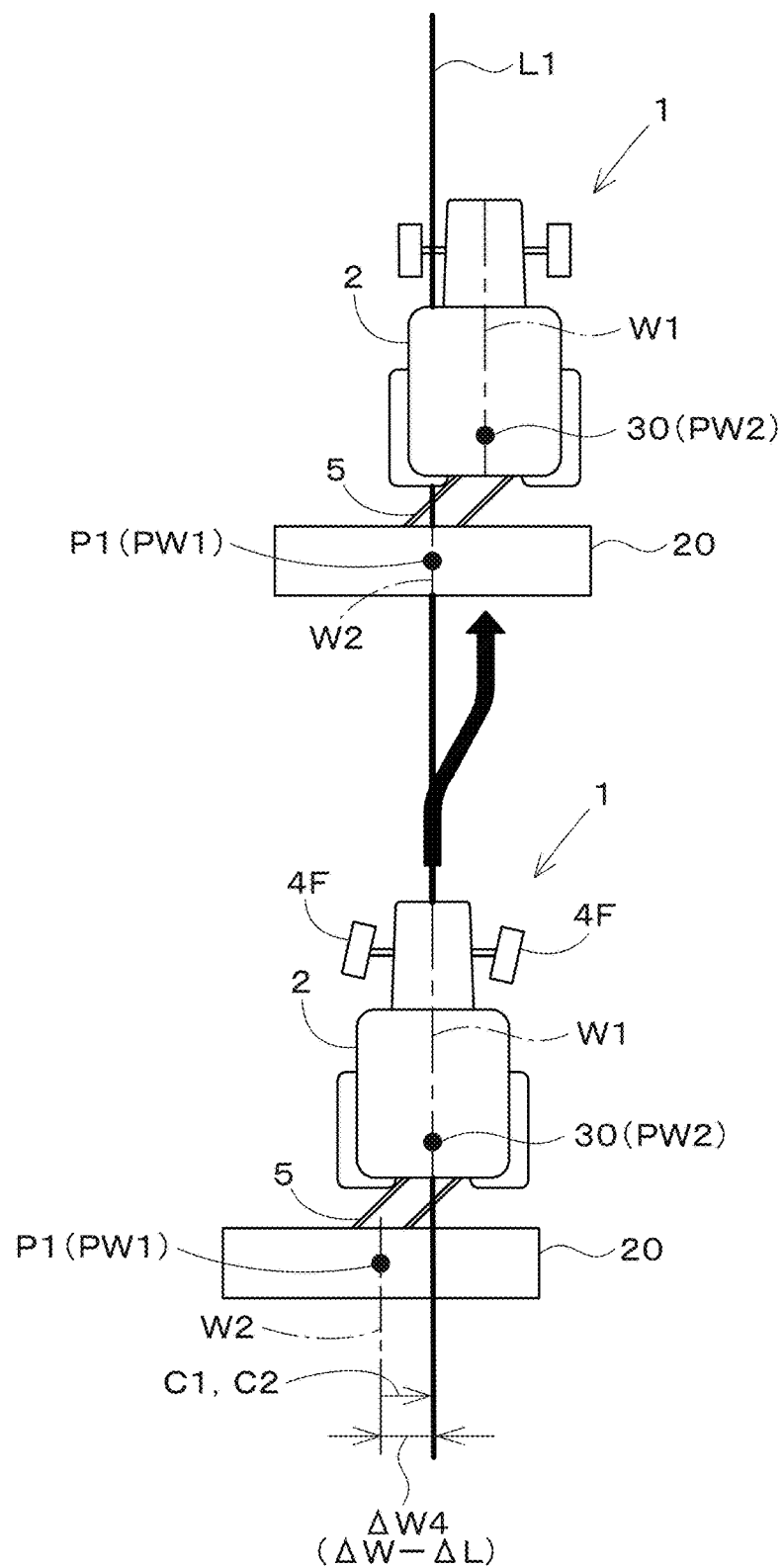
FIG. 13A is a view showing a procedure in which the traveling position corrector corrects the traveling position of the traveling vehicle so that the predetermined point is located on a target traveling route.
Figure 13B:
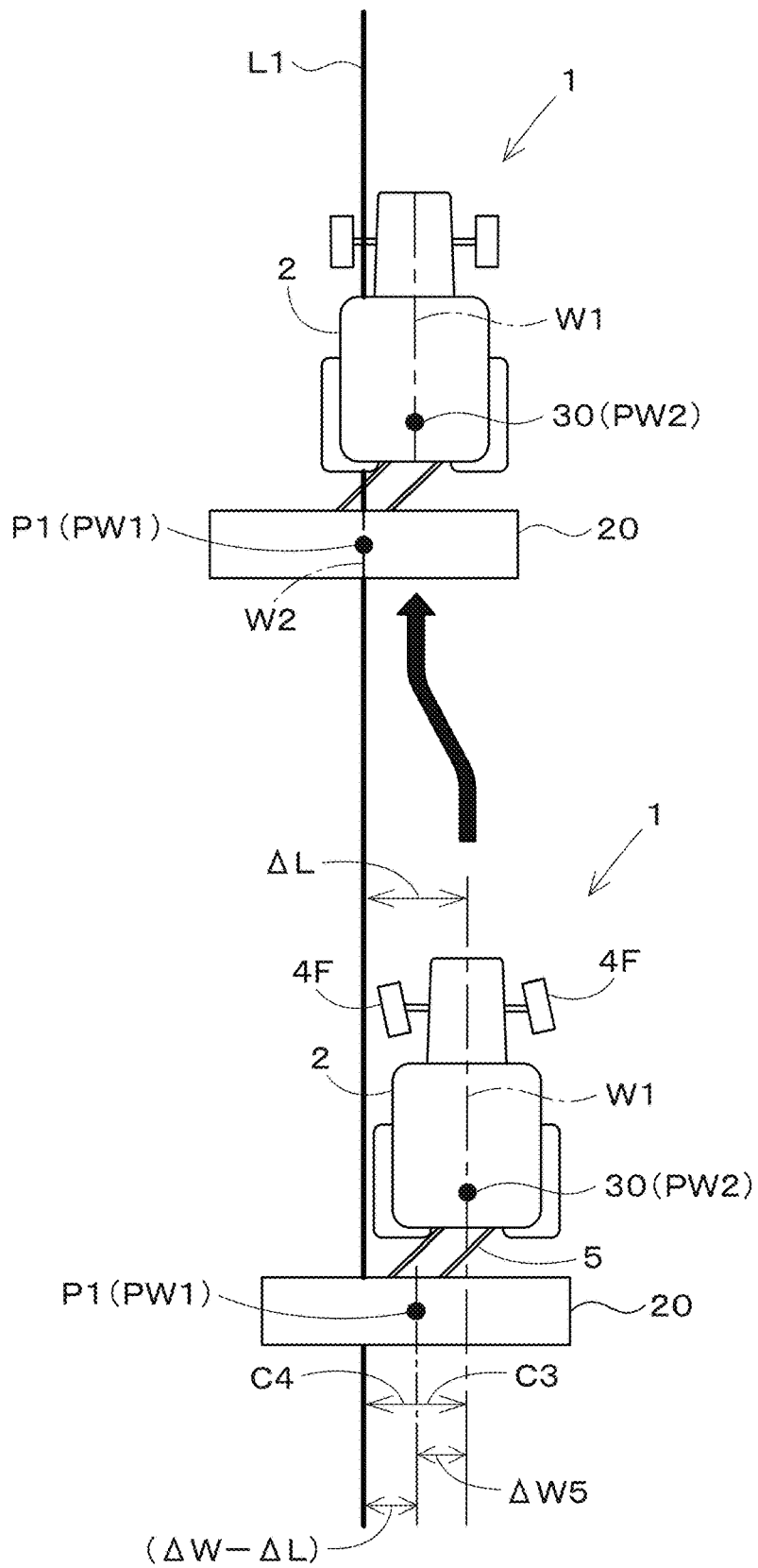
FIG. 13B is a view showing another procedure in which the traveling position corrector corrects the traveling position of the traveling vehicle so that the predetermined point is located on the target traveling route.

Referring to FIGS. 13A and 13B, the two types of control executed by the traveling position corrector 70 will be described below. Here, a case where the predetermined point P1 (that is, the control target position PW1) in the working device 20 is at the width directional center W2 of the working device 20 will be described.

FIG. 13A shows a case where the traveling position corrector 70 executes the first control.

A lower portion in FIG. 13A shows a vehicle state before the first control is executed. At this time, the width directional center W1 of the tractor 2 (that is, the detected vehicle position PW2) is located on the target traveling route L1, however the predetermined point P1 in the working device 20 (that is, the control target position PW1) is offset by ΔW4 from the detected vehicle position PW2 and is not located on the target traveling route L1. An offset direction (right) C1 of the width directional center W1 of the tractor 2 from the predetermined point P1 in the working device 20 matches a displacement direction (right) C2 of the target traveling route L1 from the predetermined point P1 in the working device 20. In this case, ΔL is equal to 0, ΔW and ΔW4 are equal but not zero, and (ΔW−ΔL) and ΔW4 are equal but not zero in the above-mentioned expression; the control target position PW1=the detected vehicle position PW2+(ΔW−ΔL).

In this case, the offset acquisition unit 50 acquires "ΔW4" as the offset amount and "right" as the offset direction in the first or second configurations described above. The traveling position corrector 70 outputs, to the autonomous traveling controller 44, a control signal based on the offset amount and offset direction acquired by the offset acquisition unit 50, specifically, a control signal to move the tractor 2 by the offset amount ΔW4 in the same direction (rightward) as the offset direction C1. The autonomous traveling controller 44 shifts a traveling position of the tractor 2 to the right by the offset amount ΔW4 by steering the front wheels 4F to the same side (rightward) as the offset direction based on the control signal. In this manner, as shown in an upper portion of FIG. 13A, a traveling position of the tractor 2 is corrected so that the predetermined point P1 in the working device 20 (that is, the control target position PW1) is located on the target traveling route L1. That is, the autonomous traveling controller 44 controls the autonomous traveling of the tractor 2 so that an expression, (ΔW−ΔL)=0, is satisfied by steering the tractor 2 rightward.

FIG. 13B shows a case where the traveling position corrector 70 executes the second control.

A lower portion in FIG. 13B shows a vehicle state before the second control is executed. At this time, the width directional center W1 of the tractor 2 (that is, the detected vehicle position PW2) is displaced by ΔL from the target traveling route L1. The predetermined point P1 in the working device 20 (that is, the control target position PW1) is offset by ΔW5 from the detected vehicle position PW2 and is not located on the target traveling route L1. An offset direction (right) C3 of the width directional center W1 of the tractor 2 from the predetermined point P1 in the working device 20 does not match (that is, in opposite direction to) a displacement direction (left) C4 of the target traveling route L1 from the predetermined point P1 in the working device 20. In this case, ΔL is not equal to 0, ΔW and ΔW5 are equal but not zero, and (ΔW−ΔL) is not zero in the above-mentioned expression; the control target position PW1=the detected vehicle position PW2+(ΔW−ΔL).

In this case, the offset acquisition unit 50 acquires "ΔW5" as the offset amount and "right" as the offset direction. The traveling position corrector 70 outputs, to the autonomous traveling controller 44, a control signal based on an offset amount and offset direction acquired by the offset acquisition unit 50, specifically, a control signal to move the tractor 2 in a direction opposite to the offset direction C3 (left) by the offset amount ΔW5. The autonomous traveling controller 44 shifts a traveling position of the tractor 2 to the left by the offset amount ΔW5 by steering the front wheels 4F in a direction opposite to the offset direction (left) based on the control signal. In this manner, as illustrated by an upper portion in FIG. 13B, a traveling position of the tractor 2 is corrected so that the predetermined point P1 in the working device 20 (that is, the control target position PW1) is located on the target traveling route L1. That is, the autonomous traveling controller 44 controls the autonomous traveling of the tractor 2 so that an expression, (ΔW−ΔL)=0, is satisfied by steering the tractor 2 leftward.

As described above, the traveling position corrector 70 steers the front wheels 4F in the same direction as the offset direction in the first control, and steers the front wheels 4F in the direction opposite to the offset direction in the second control as the "control based on an offset direction. In this manner, even when the working device 20 is offset in the vehicle width direction from the tractor 2, a work trace of the working device 20 can be prevented from deviating in the vehicle width direction from the target traveling route L1.

Figure 13C:
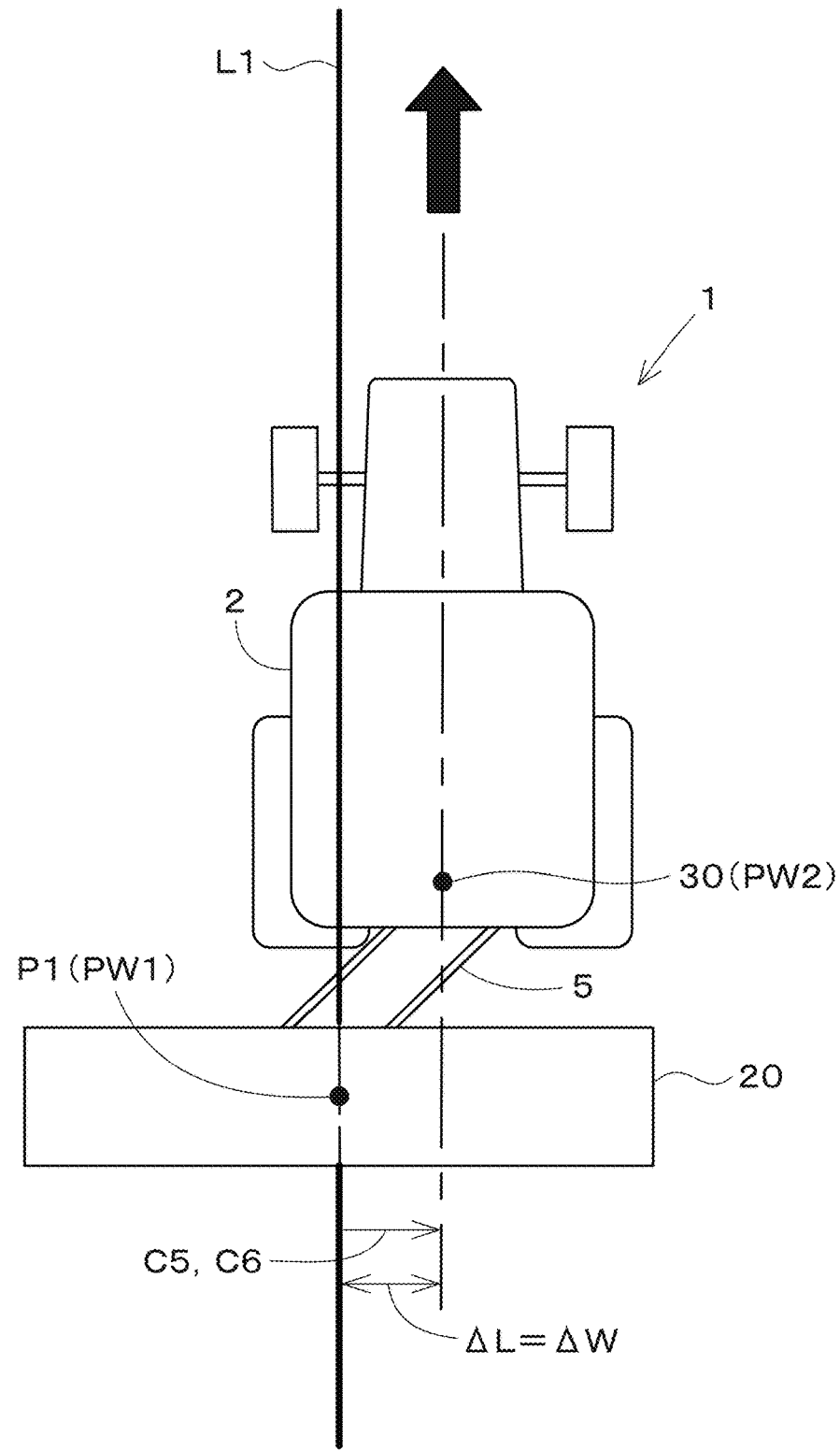
FIG. 13C is a view showing another procedure in which the traveling position corrector corrects the traveling position of the traveling vehicle so that the predetermined point is located on the target traveling route.

As shown in FIG. 13C, the traveling position corrector 70 does not correct a traveling position in the vehicle width direction when the predetermined point P1 in the working device 20 (that is, the control target position PW1) is located on the target traveling route L1. When ΔL is equal to ΔW and a displacement direction C5 of the detected vehicle position PW2 from the target traveling route L1 is the same as an offset direction C6 acquired by the offset acquisition unit 50 (in a case of FIG. 13C), the traveling position corrector 70 determines that the predetermined point P1 in the working device 20 (that is, the control target position PW1) is located on the target traveling route L1, and accordingly the traveling position is not corrected. In this case, since the predetermined point P1 in the working device 20 is located on the target traveling route L1, no correction to the travel position is required.

In correcting a traveling position of the tractor 2 based on an offset amount and an offset direction acquired by the offset acquisition unit 50, the traveling position corrector 70 may determine that the predetermined point P1 in the working device 20 is located on the target traveling route L1 when an expression, (ΔW−ΔL), is not zero but is less than a predetermined threshold. In this case, the traveling position corrector 70 controls autonomous traveling of the tractor 2 so that an expression, (ΔW−1 ΔL), is less than a threshold.

The tractor 2 may include a switching device that switches the traveling position corrector 70 between an in use mode and a not in use mode. For example, the traveling position corrector 70 can be not in use when the tractor 2 travels without the working device 20 or when an offset in the vehicle width direction between the width directional center of the tractor 2 and the predetermined point in the working device 20 is allowed depending on work contents or the like. When the traveling position corrector 70 is not in use, the tractor 2 autonomously travels so that the width directional center W1 follows the target traveling route L1 because no correction is made by the traveling position corrector 70.

According to the above-mentioned working vehicle 1, the following effects are provided.

The working vehicle 1 includes the traveling vehicle 2 configured to autonomously travel on the target traveling route L1, the working device 20 attached to the traveling vehicle 2, the offset acquisition unit 50 to acquire an offset amount and an offset direction in the vehicle width direction between the width directional center W1 of the traveling vehicle 2 and the predetermined point P1 in the working device 20, and the traveling position corrector 70 to correct, based on the offset amount and the offset direction acquired by the offset acquiring unit 50, a traveling position of the traveling vehicle 2 so that the predetermined point P1 is located on the target traveling route L1.

According to this configuration, the traveling position corrector 70 is capable of correcting, based on the offset amount and the offset direction of the predetermined point P1 in the working device 20 acquired by the offset acquisition unit 50, the traveling position of the traveling vehicle 2 so that the predetermined point P1 is located on the target traveling route L1. Thus, even in a case where the working device 20 is offset in the vehicle width direction from the traveling vehicle 2, a work trace of the working device 20 can be prevented from deviating in the vehicle width direction from the target traveling route L1.

In addition, the working device 20 is attached to the rear portion of the traveling vehicle 2. The offset acquisition unit 50 acquires the offset amount and the offset direction based on the width directional center W2 of the working device 20 serving as the predetermined point P1.

According to this configuration, since the width directional center W2 of the working device 20 is defined as the predetermined point P1, the predetermined point P1 can be easily set based on a width (that is, a length in the vehicle width direction) of the working device 20.

In addition, the working vehicle 2 includes the display device 14 configured to display the offset amount input portion 51 to which the offset amount is input and the offset direction input portion 52 to which the offset direction is input. The offset acquisition unit 50 acquires the offset amount input to the offset amount input portion 51 and the offset direction input to the offset direction input portion 52.

According to this configuration, the offset amount and the offset direction can be acquired reliably without need for an additional configuration (that is, a sensor or the like) to acquire the offset amount and the offset direction.

In addition, the working vehicle 2 includes the attaching unit 5 provided on the rear portion of the traveling vehicle 2 and configured to have the working device 20 attached thereto, and the detector 60 to detect a change in position of the attaching unit 5 in the vehicle width direction relative to the reference position that is the position of the attaching unit 5 at which the width directional center W1 of the traveling vehicle 2 matches the predetermined point P1 in the vehicle width direction. The offset acquisition unit 50 acquires the offset amount and the offset direction based on the change detected by the detector 60.

According to this configuration, even when the predetermined point P1 in the working device 20 is offset in the vehicle width direction from the width directional center W1 of the traveling vehicle 2 during autonomous traveling of the traveling vehicle 2, the offset amount and the offset direction can be acquired reliably.

In addition, the attaching unit 5 includes the three-point linkage mechanism including the lower linkages 5b, the top linkage 5c, and the lift rod 5d. The working device 20 is connected to at least the lower linkages 5b, and the detector 60 includes the sensors 62 and 66 to detect the change when the positions of the lower linkages 5b change from the reference position.

According to this configuration, by detecting a change in positions of the lower linkages 5b with the sensors 62 and 66, the offset acquisition unit 50 can acquire the offset amount and the offset direction, so that the offset amount and the offset direction can be easily acquired with such a simple configuration.

In addition, the sensor is the angle sensor 62 or the stroke sensor 66.

According to this configuration, the sensors 62 and 66 are capable of reliably detecting the change in positions of the lower linkages 5b with such a simple configuration.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:
a traveling vehicle to autonomously travel on a target traveling route;
a working device attached to the traveling vehicle; and
a controller configured or programmed to control autonomous traveling of the traveling vehicle; wherein
when an offset amount and an offset direction in a vehicle width direction between a width directional center of the traveling vehicle and a predetermined point in the working device are acquired, the controller corrects, based on the offset amount and the offset direction, a traveling position of the traveling vehicle so as to locate the predetermined point on the target traveling route;
when a width directional center of the working device matches a center of work width in the vehicle width direction, the controller corrects the traveling position of the traveling vehicle based on the offset amount and the offset direction between the width directional center of the traveling vehicle and the width directional center of the working device defining the predetermined point; and
when the width directional center of the working device does not match the center of work width in the vehicle width direction, the controller corrects the traveling position of the traveling vehicle based on the offset amount and the offset direction between the width directional center of the traveling vehicle and the center of work width defining the predetermined point.

2. The working vehicle according to claim 1, further comprising a display device to display:
an offset amount input portion to which the offset amount is input; and
an offset direction input portion to which the offset direction is input; wherein
the controller corrects the traveling position of the traveling vehicle based on the offset amount acquired by inputting the offset amount input to the offset amount input portion and the offset direction acquired by inputting the offset direction input to the offset direction input portion.

3. The working vehicle according to claim 1, further comprising:
a connector provided on a rear portion of the traveling vehicle and structured to have the working device attached thereto; and
a detector to detect a change in position of the connector in the vehicle width direction relative to a reference position that is a position of the connector at which the width directional center of the traveling vehicle matches the predetermined point in the vehicle width direction; wherein the controller corrects the traveling position of the traveling vehicle based on the offset amount and the offset direction acquired based on the change detected by the detector.

4. The working vehicle according to claim 3, wherein
the connector includes a three-point linkage mechanism including a lower linkage, a top linkage, and a lift rod;
the working device is connected to at least the lower linkage; and
the detector includes:
a sensor to detect the change when a position of the lower linkage changes from the reference position.

5. The working vehicle according to claim 4, wherein the sensor is an angle sensor or a stroke sensor.

6. The working vehicle according to claim 1, wherein
when the offset direction of the width directional center of the traveling vehicle from the predetermined point is a same as a direction of deviation of the target traveling route from the predetermined point, the controller corrects the traveling position of the traveling vehicle by moving the traveling vehicle at the offset amount in the same direction as the offset direction; and
when the offset direction of the width directional center of the traveling vehicle from the predetermined point is opposite to the direction of deviation of the target traveling route from the predetermined point, the controller corrects the traveling position of the traveling vehicle by moving the traveling vehicle at the offset amount in the direction opposite to the offset direction.

7. A working vehicle comprising:
a traveling vehicle configured to autonomously travel on a target traveling route;
a working device attached to the traveling vehicle; and
a controller configured or programmed to control autonomous traveling of the traveling vehicle; wherein
when an offset amount and an offset direction in a vehicle width direction between a width directional center of the traveling vehicle and a predetermined point in the working device are acquired, the controller corrects, based on the offset amount and the offset direction, a traveling position of the traveling vehicle so as to locate the predetermined point on the target traveling route;
when the offset direction of the width directional center of the traveling vehicle from the predetermined point is a same as a direction of deviation of the target traveling route from the predetermined point, the controller corrects the traveling position of the traveling vehicle by moving the traveling vehicle at the offset amount in the same direction as the offset direction; and
when the offset direction of the width directional center of the traveling vehicle from the predetermined point is opposite to the direction of deviation of the target traveling route from the predetermined point, the controller corrects the traveling position of the traveling vehicle by moving the traveling vehicle at the offset amount in the direction opposite to the offset direction.

8. The working vehicle according to claim 7, further comprising
a display device configured to display:
an offset amount input portion to which the offset amount is input; and
an offset direction input portion to which the offset direction is input; wherein
the controller corrects the traveling position of the traveling vehicle based on the offset amount acquired by inputting the offset amount to the offset amount input portion and the offset direction acquired by inputting the offset direction to the offset direction input portion.

9. The working vehicle according to claim 7, further comprising:
a connector provided on a rear portion of the traveling vehicle and structured to have the working device attached thereto; and
a detector to detect a change in position of the connector in the vehicle width direction relative to a reference position that is a position of the connector at which the width directional center of the traveling vehicle matches the predetermined point in the vehicle width direction; wherein
the controller corrects the traveling position of the traveling vehicle based on the offset amount and the offset direction acquired based on the change detected by the detector.

10. The working vehicle according to claim 9, wherein
the connector includes a three-point linkage mechanism including a lower linkage, a top linkage, and a lift rod;
the working device is connected to at least the lower linkage; and
the detector includes a sensor to detect the change when a position of the lower linkage changes from the reference position.

11. The working vehicle according to claim 10, wherein the sensor is an angle sensor or a stroke sensor.

* * * * *